United States Patent
Rouse et al.

(10) Patent No.: US 11,637,453 B2
(45) Date of Patent: Apr. 25, 2023

(54) SYNCHRONOUS RECTIFIER FOR USE IN A WIRELESS POWER TRANSFER SYSTEM AND METHOD FOR SYNCHRONOUS RECTIFICATION IN WIRELESS POWER TRANSFER

(71) Applicant: Solace Power Inc., Mount Pearl (CA)

(72) Inventors: Chris Rouse, Mount Pearl (CA); Amir Tahavorgar, Mount Pearl (CA)

(73) Assignee: SOLACE POWER INC., Mount Pearl (CA)

( * ) Notice: Subject to any disclaimer, the term of this patent is extended or adjusted under 35 U.S.C. 154(b) by 16 days.

(21) Appl. No.: 17/472,002

(22) Filed: Sep. 10, 2021

(65) Prior Publication Data
US 2022/0085653 A1   Mar. 17, 2022

Related U.S. Application Data

(60) Provisional application No. 63/076,982, filed on Sep. 11, 2020.

(51) Int. Cl.
*H02J 50/12* (2016.01)
*H02M 7/217* (2006.01)

(52) U.S. Cl.
CPC ............. *H02J 50/12* (2016.02); *H02M 7/217* (2013.01)

(58) Field of Classification Search
CPC combination set(s) only.
See application file for complete search history.

(56) References Cited

U.S. PATENT DOCUMENTS

| | | | | |
|---|---|---|---|---|
| 10,439,509 | B1 * | 10/2019 | Sharma | H03K 3/02 |
| 10,461,644 | B1 * | 10/2019 | Gong | H02M 3/1582 |
| 2018/0091040 | A1 * | 3/2018 | Wong | H02M 7/217 |
| 2018/0123400 | A1 * | 5/2018 | Leabman | H02J 50/12 |
| 2021/0351625 | A1 * | 11/2021 | Chen | H02M 3/3382 |

* cited by examiner

*Primary Examiner* — Daniel Kessie
*Assistant Examiner* — Brian K Baxter
(74) *Attorney, Agent, or Firm* — Harness, Dickey & Pierce, P.L.C.

(57) ABSTRACT

A rectifier for use in a receiver of a wireless power transfer system for receiving wireless power transferred for a transmitter of the wireless power transfer system. The rectifier comprises a field effect transistor (FET) comprising: a source terminal electrically connected to ground; a drain terminal electrically connected to a receive element of the receiver. The receive element is for extracting power from the transmitter of the wireless power transfer system. The FET further comprises a gate terminal electrically connected to the receive element. The gate terminal is driven by a gate signal in phase with an input signal received at the receive element.

13 Claims, 21 Drawing Sheets

SYNCHRONOUS RECTIFIER FOR USE IN A WIRELESS POWER TRANSFER SYSTEM AND METHOD FOR SYNCHRONOUS RECTIFICATION IN WIRELESS POWER TRANSFER

CROSS REFERENCE TO RELATED APPLICATION

The subject application claims the benefit of U.S. Provisional Application No. 63/076,982 filed on Sep. 11, 2020, the entire content of which is incorporated herein by reference.

TECHNICAL FIELD

The subject disclosure relates generally to wireless power transfer, and in particular, to a synchronous rectifier for use in a wireless power transfer system and to a method for synchronous rectification in wireless power transfer.

BACKGROUND

Wireless charging and wireless power transfer systems are becoming an increasingly important technology to enable the next generation of devices. The potential benefits and advantages offered by the technology is evident by the increasing number of manufacturers and companies investing in the technology.

A variety of wireless power transfer systems are known. A typical wireless power transfer system includes a wireless power transmitter comprising a power source electrically connected to a transmit element, and a wireless power receiver comprising a receive element electrically connected to a load.

For example, in magnetic induction systems, the transmit element comprises an induction coil that transfers electrical energy from the power source to an induction coil of the receive element. The transferred electrical energy is then applied to the load. Power transfer occurs due to coupling of magnetic fields between the induction coils of the transmit and receive elements. The range of these magnetic induction systems is however, limited and the induction coils of the transmit and receive elements must be in optimal alignment for power transfer. Resonant magnetic systems, which transfer power due to coupling of magnetic fields between the induction coils of the transmit and receive elements also exist. In these resonant magnetic systems, the induction coils of the transmit and receive elements are resonated using high quality factor (high Q) capacitors. The range of power transfer in resonant magnetic systems is increased over that of magnetic induction systems and alignment issues are rectified. While electromagnetic energy is produced in magnetic induction and resonant magnetic systems, the majority of power transfer occurs via the magnetic field. Little, if any, power is transferred via electric induction or resonant electric induction.

Another example of wireless power systems is electric field coupling systems in which the transmit and receive elements have capacitive electrodes and power transfer occurs due to coupling of electric fields between the capacitive electrodes of the transmit and receive elements. Resonant electric field systems also exist in which the capacitive electrodes of the transmit and receive elements are made resonant using high quality factor (high Q) inductors. Similar to resonant magnetic systems, resonant electric field systems have an increased range of power transfer compared to that of non-resonant electric field systems and alignment issues are rectified. While electromagnetic energy is produced in electric induction and resonant electric systems, the majority of power transfer occurs via the electric field. Little, if any, power is transferred via magnetic induction or resonant magnetic induction.

Other exemplary wireless power systems may use radio frequency (RF) waves to transmit power. Controlled constructive interference of the RF waves forms energy at the receiver to transfer power wirelessly.

While wireless power transfer systems, transmitters, receivers, and methods are known, improvements are desired.

This background serves only to set a scene to allow a person skilled in the art to better appreciate the following description. Therefore, none of the above discussion should necessarily be taken as an acknowledgement that that discussion is part of the state of the art or is common general knowledge. One or more aspects/embodiments of the disclosure may or may not address one or more of the background issues.

SUMMARY

According to an aspect of the disclosure there is provided a rectifier for use in a receiver of a wireless power transfer system, the rectifier from receiving wireless power transferred for a transmitter of the wireless power transfer system, the rectifier comprising a field effect transistor (FET) comprising: a source terminal electrically connected to ground; a drain terminal electrically connected to a receive element of the receiver, the receive element for extracting power from the transmitter of the wireless power transfer system; and a gate terminal electrically connected to the receive element, the gate terminal driven by a gate signal in phase with an input signal received at the receive element.

The rectifier may further comprise: a trigger circuit electrically connected to the receive element and a gate driver, the trigger circuit outputting a trigger signal for operating the gate driver.

The trigger signal may comprise a pulse signal.

The trigger circuit may comprise: a sampling circuit for sampling the input signal.

The sampling circuit may be a voltage divider.

The trigger circuit may further comprise: a delay line for delaying output of the sampling circuit such that the gate signal is synchronized with the input signal received at the drain element.

The trigger circuit may further comprise: a comparator for generating a clock signal by comparing a delayed signal output by the delay line to a direct current (DC) voltage level.

The trigger circuit may comprise: a resistor-capacitor (RC) delay circuit for delaying output of the sampling circuit such that the gate signal is synchronized with the input signal received at the receive element.

The RC delay circuit may comprise at least one resistor electrically connected to at least one capacitor.

The trigger circuit may comprise: a comparator for generating a clock signal by comparing a delayed signal output by the RC delay circuit to a DC voltage level.

The rectifier may further comprise: the gate driver for receiving the trigger signal and producing the gate signal for input into the gate terminal to control operation of the rectifier.

The rectifier may further comprise: an input stage for at least one of:

optimizing load impedance, ensuring current input to the drain terminal is approximately sinusoidal, and reducing harmonics.

The input stage may comprise a double impedance inverter circuit.

The rectifier may further comprise: a converter for converting a signal for powering the trigger circuit.

The rectifier may be a load-independent class E synchronous rectifier.

According to another aspect of the disclosure there is provided a receiver for extracting power from a transmitter of a wireless power transfer system, the receiver comprising: a receive element for receiving wireless power transferred from the transmitter; and any of the described rectifiers, the rectifier electrically connected to the receive element.

The receive element may be for extracting power via electric or magnetic field coupling.

The receive element may be for extracting power via resonant and/or non-resonant electric or magnetic field coupling.

An input signal received at the receive element may be an alternating current (AC) signal.

The receiver may further comprise: a load electrically connected to the rectifier.

According to another aspect of the disclosure there is provided a wireless power transfer system for transmitting power via magnetic or electric field coupling, the wireless power transfer system comprising: a transmitter comprising a transmit element for generating a magnetic or electric field; a receiver comprising: a receive element for extracting power from the magnetic or electric field via magnetic or electric field coupling, respectively; and any of the described rectifiers, the rectifier electrically connected to the receive element.

The wireless power transfer system may further comprise: a power source electrically connected to the transmitter.

The wireless power transfer system may further comprise: a load electrically connected to the rectifier.

According to another aspect of the disclosure there is provided a method of rectifying an input signal received at a receive element of a receiver of a wireless power transfer system, the receiver comprising a rectifier comprising a field effect transistor (FET) comprising: a source terminal electrically connected to ground; a drain terminal connected to the receive element; and a gate terminal electrically connected to the receive element, the method comprising: driving the gate terminal by a gate signal in phase with the input signal received at the receive element.

The method may further comprise: driving a gate driver for generating the gate signal.

The method may further comprise: receiving the input signal at a trigger circuit; and operating the gate driver via a trigger signal output by the trigger circuit.

The trigger signal may comprise a pulse signal.

The method may further comprise: sampling the input signal via a sampling circuit.

The method may further comprise: delaying output of the sampling circuit such that the gate signal is synchronized with the input signal received at the receive element.

Delaying output may comprise delaying output via a delay line or an RC delay circuit.

The method may further comprise at least one of: optimizing load impedance; ensuring current input to the drain terminal is approximately sinusoidal; and reducing harmonics.

According to another aspect of the disclosure there is provided a method of receiving wireless power, the method comprising: extracting power from a magnetic or electric field generated by a transmit element of a transmitter of the wireless power transfer system by a receive element of a receiver of the wireless power transfer system; and rectifying the extracted power with a field effect transistor (FET), the FET controlled via a gate signal in phase with a signal of the extracted power It should be understood that any features described in relation to one aspect, example or embodiment of the disclosure may also be used in relation to any other aspect or embodiment of the disclosure.

Other advantages of the present disclosure will become apparent to one of skill in the art from the detailed description in association with the following drawings.

BRIEF DESCRIPTION OF THE FIGURES

A description is now given, by way of example only, with reference to the accompanying drawings, in which.

DESCRIPTION OF SPECIFIC EMBODIMENTS

Figure 1:
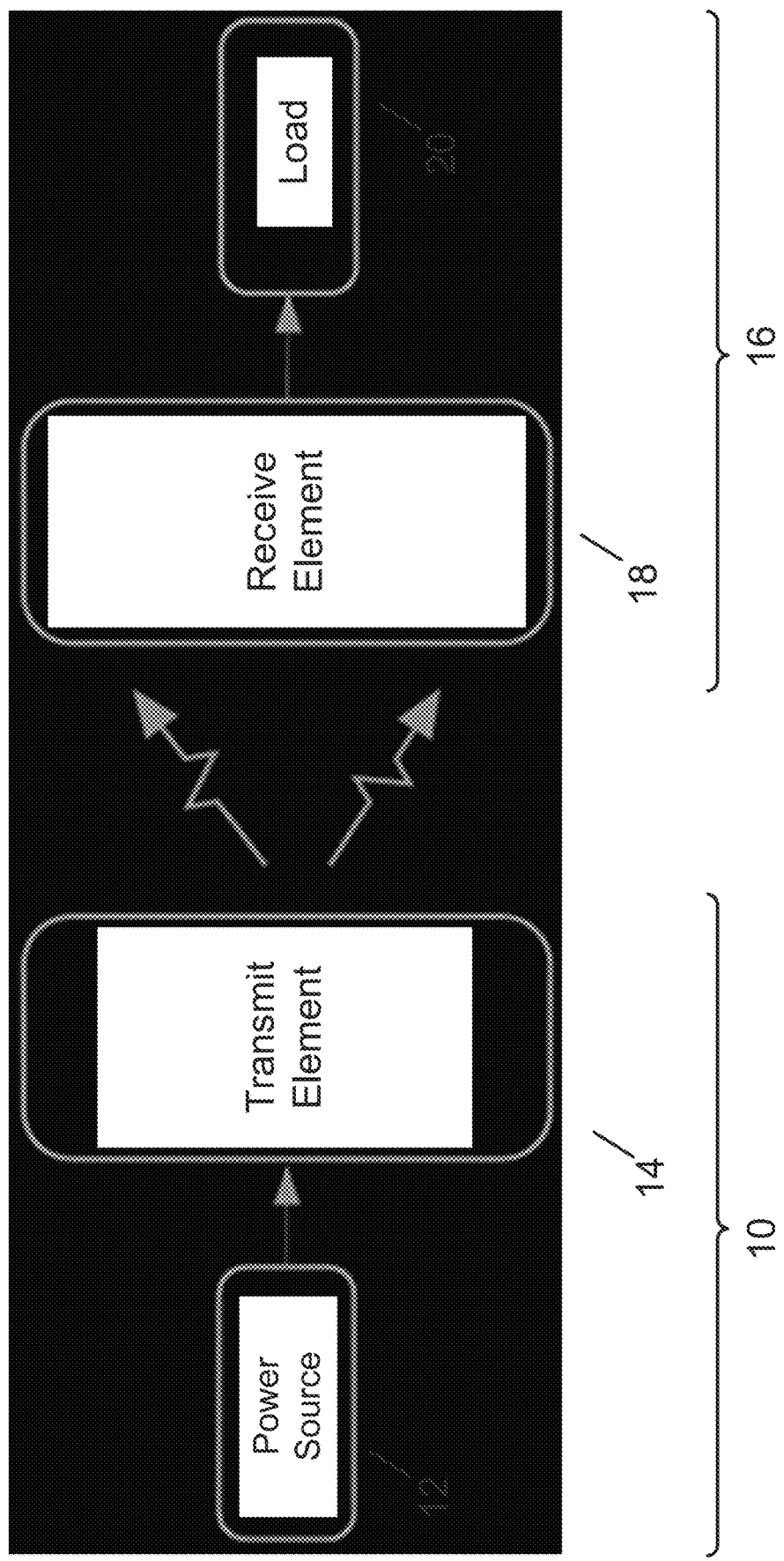
FIG. 1 is a block diagram of a wireless power transfer system.

The foregoing summary, as well as the following detailed description of certain embodiments will be better understood when read in conjunction with the accompanying drawings. As will be appreciated, like reference characters are used to refer to like elements throughout the description and drawings. As used herein, an element or feature recited in the singular and preceded by the word "a" or "an" should be understood as not necessarily excluding a plural of the elements or features. Further, references to "one example" or "one embodiment" are not intended to be interpreted as excluding the existence of additional examples or embodiments that also incorporate the recited elements or features of that one example or one embodiment. Moreover, unless explicitly stated to the contrary, examples or embodiments "comprising", "having" or "including" an element or feature or a plurality of elements or features having a particular property might further include additional elements or features not having that particular property. Also, it will be appreciated that the terms "comprises", "has" and "includes" mean "including but not limited to" and the terms "comprising", "having" and "including" have equivalent meanings.

As used herein, the term "and/or" can include any and all combinations of one or more of the associated listed elements or features.

It will be understood that when an element or feature is referred to as being "on", "attached" to, "connected" to, "coupled" with, "contacting", etc. another element or feature, that element or feature can be directly on, attached to, connected to, coupled with or contacting the other element or feature or intervening elements may also be present. In contrast, when an element or feature is referred to as being, for example, "directly on", "directly attached" to, "directly connected" to, "directly coupled" with or "directly contacting" another element of feature, there are no intervening elements or features present.

It will be understood that spatially relative terms, such as "under", "below", "lower", "over", "above", "upper", "front", "back" and the like, may be used herein for ease of describing the relationship of an element or feature to another element or feature as depicted in the figures. The spatially relative terms can, however, encompass different orientations in use or operation in addition to the orientation depicted in the figures.

Reference herein to "example" means that one or more feature, structure, element, component, characteristic and/or operational step described in connection with the example is included in at least one embodiment and or implementation of the subject matter according to the present disclosure. Thus, the phrases "an example," "another example," and similar language throughout the present disclosure may, but do not necessarily, refer to the same example. Further, the subject matter characterizing any one example may, but does not necessarily, include the subject matter characterizing any other example.

Reference herein to "configured" denotes an actual state of configuration that fundamentally ties the element or feature to the physical characteristics of the element or feature preceding the phrase "configured to".

Unless otherwise indicated, the terms "first," "second," etc. are used herein merely as labels, and are not intended to impose ordinal, positional, or hierarchical requirements on the items to which these terms refer. Moreover, reference to a "second" item does not require or preclude the existence of lower-numbered item (e.g., a "first" item) and/or a higher-numbered item (e.g., a "third" item).

As used herein, the terms "approximately" and "about" represent an amount close to the stated amount that still performs the desired function or achieves the desired result. For example, the terms "approximately" and "about" may refer to an amount that is within less than 10% of, within less than 5% of, within less than 1% of, within less than 0.1% of, or within less than 0.01% of the stated amount.

Use of the word "exemplary", unless otherwise stated, means 'by way of example' or 'one example of', and does not mean a preferred or optimal design, configuration, or implementation.

Turning now to FIG. 1, a wireless power transfer system 2 is shown. The wireless power transfer system 2 comprises a transmitter 10 comprising a power source 12 electrically connected to a transmit element 14, and a receiver 16 comprising a receive element 18 electrically connected to a load 20. Power is transferred from the power source 12 to the transmit element 14. The power is then transferred from the transmit element 14 to the receive element 16 via resonant or non-resonant electric or magnetic field coupling. The power is then transferred from the receive element 16 to the load 18.

Figure 2:
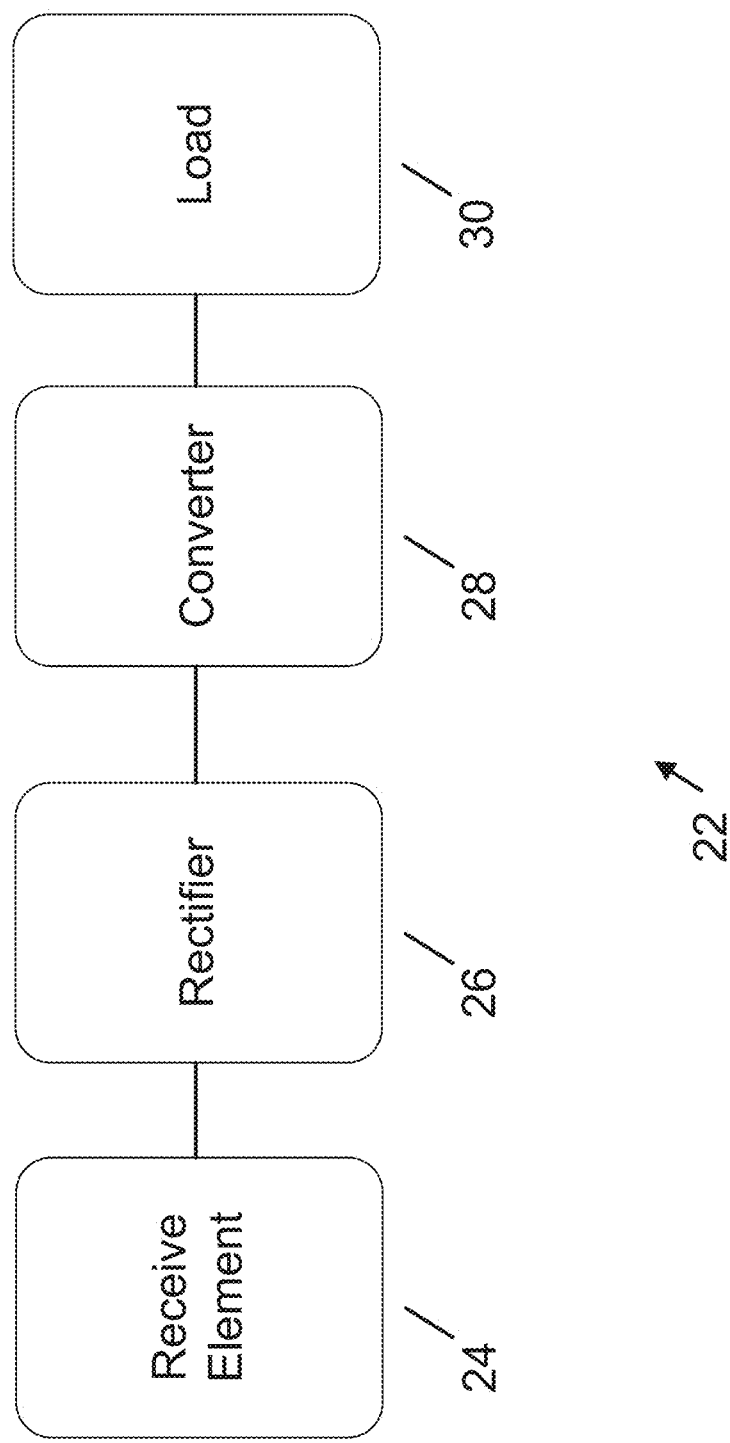
FIG. 2 is a block diagram of a receiver of a wireless power transfer system.

Turning now to FIG. 2, an exemplary receiver 22 is shown in more detail. The receiver 22 comprises a receive element 24, a rectifier 26, a converter 28 and a load 30. The receive element 24 is electrically connected to the rectifier 26. The receive element 24 is configured to receive power from a transmitter, e.g. transmitter 10, using resonant or non-resonant electric or magnetic field coupling. The receive element 22 may extract power from a transmitter via non-resonant or resonant magnetic or electric field coupling. As such, the receive element 24 comprises one or more receive coils (i.e. inductors) or one or more capacitive electrodes. The corresponding transmitter comprises corresponding transmit coils (i.e. inductors) or capacitive electrodes, respectively.

The rectifier 26 is electrically connected to the receive element 24. The rectifier 26 is electrically connected to the converter 28. The rectifier 26 is an alternating current (AC)/direct current (DC) rectifier. Generally, the rectifier 26 is for rectifying AC received at the receive element 24 to DC. Specifically, the rectifier 26 is for converting a sinusoidal radio frequency (RF) power signal from the receive element 24 to a DC power signal. The rectifier 26 is configured to output the DC power signal to the converter 28.

The converter 28 is electrically connected to the rectifier 26. The converter 28 is electrically connected to the load 30. The converter 28 is a DC/DC converter. The DC power signal is output from the rectifier 26 to the converter 28. The converter 28 interfaces the rectifier 26 to the load 30. The converter 28 is for converting the received DC voltage signal to a desired voltage level. The converted DC power signal is output from the converter 28 to the load 30.

The load 30 is electrically connected to the converter 28. The load 30 may be a fixed or a variable load.

While the receiver 22 has been described as comprising the converter 28, one of skill in the art will appreciate that other configurations are possible. In another embodiment, the receiver 22 does not comprise the converter 28. In this embodiment, the rectifier 26 is electrically connected to the load 30. The rectifier 26 is configured to generate a DC power signal that is acceptable to the load 30.

As previously stated, the rectifier 26 is for converting sinusoidal RF power signal from the receive element 24 to a DC power signal. The operation of the rectifier 26 may not be synchronized with the sinusoidal RF power signal. As such, there may be a need to synchronize the switching points in the rectifier 26 with the waveform of the received sinusoidal RF power signal. Unsynchronized switching points may result in loss of received power which may reduce power transfer efficiency and provide insufficient power to the load 30.

The rectifier 26 may comprise at least one diode for rectifying AC to DC. Generally, the diode is positioned between an AC source and a load configured to operate using DC. A diode operates like a valve for electric current by allowing the flow of current in one direction and opposing the flow of current in the other direction. Thus, while the AC is flowing in a first direction, the diode operates like a closed switch (i.e. forward biased) allowing current through to the load 30. When AC is flowing in a second direction opposite the first direction, the diodes operates like an open switch (i.e. reverse biased) preventing current through to the load 30. Therefore, unidirectional current flows through to the load 30 without a change in polarity.

Diodes are generally lossy electrical components in that they consume a significant amount of the electrical power they rectify. For example, if a diode has a forward threshold of 0.7 V, it consumes about 0.7 V to be forward biased. There is therefore a 0.7 V voltage drop across the diode when a current flows through the diode.

To at least partially reduce the lossy effects of diodes at the rectifier 26, a rectifier 26 may alternatively comprise a transistor, for example, a field-effect transistor (FET). The gate of the FET is biased by a separate power source. The current between the source and drain of the FET is controlled by the voltage at the gate.

As previously stated, there may be a need to synchronize the switching points in the rectifier 26 with the waveform of the received sinusoidal RF power signal. For example, synchronized switching points may increase power transfer efficiency and may ensure sufficient power is provided to the load 30 and/or converter 28.

Broadly speaking, the disclosed rectifier comprises a source terminal electrically connected to ground; and a drain terminal electrically connected to a receive element of a receiver of a wireless power transfer system. The receive element is for extracting power from the transmitter of the wireless power transfer system. The rectifier further comprises a gate terminal electrically connected to the receive element. The gate terminal is driven by a gate signal in phase with an input signal received at the receive element.

The gate signal controls operation of the current between the source and drain thus controlling rectification of the input signal received at the receive element. As the gate signal is in phase with the input signal, the FET operates as a class E inverter. A class E inverter generally operates at high efficiency resulting in a high efficiency rectifier. The particulars of the disclosed rectifier will now be described.

Figure 3:
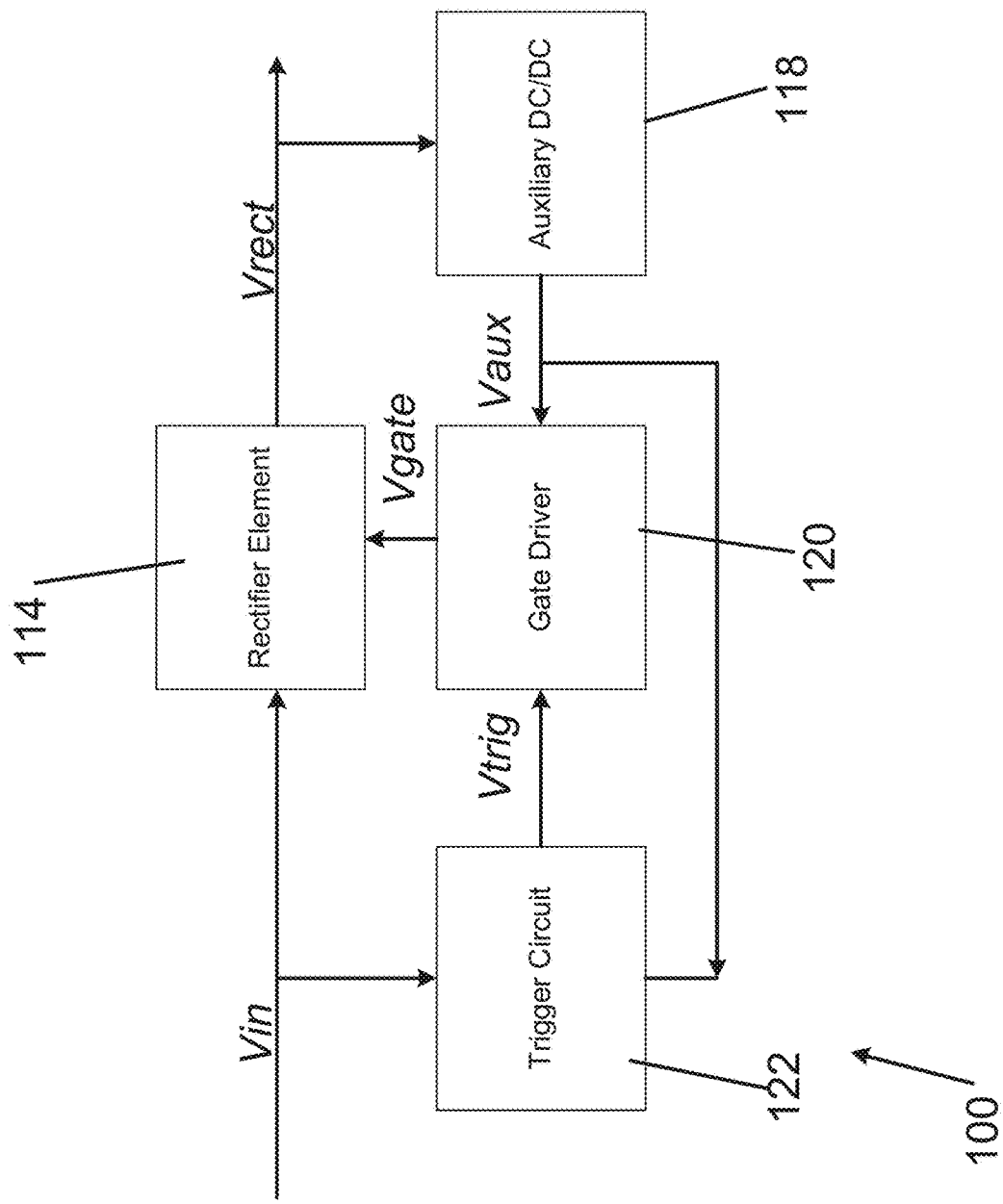
FIG. 3 is a block diagram of a rectifier according to an aspect of the disclosure for use in a wireless power transfer system.

Turning now to FIG. 3, a block diagram of a rectifier 100 in accordance with an aspect of the disclosure is shown. The rectifier 100 is for use in a wireless power transfer system. In particular, the rectifier 100 is suitable for use in a receiver of a wireless power transfer system. The rectifier 100 is a synchronous rectifier as will be described.

The rectifier 100 comprises a rectifier element 114, an auxiliary DC/DC converter 118, a trigger circuit 122 and a gate driver 120. The rectifier element 114 is for rectifying the input RF power to DC. The rectifier element 114 is electrically connected to the trigger circuit 122 and the auxiliary DC/DC converter 118. The rectifier element 114 comprises at least one FET. The FET of the rectifier element 114 is electrically connected at a gate terminal to the gate driver 120 such that the rectifier element 114 is controlled by the gate driver 120 as will be described.

In this embodiment, the rectifier element 114 comprises a load-independent class E rectifier. In general, in a class E rectifier the performance of the rectifier is optimized for a specified output load, i.e. a desired load. During operation as the output load varies from the desired load, the rectifier DC voltage varies substantially. Furthermore, when the output load varies from the desired load, the zero-voltage-switching (ZVS) operation of switches of the rectifier becomes compromised and, consequently, the efficiency of the rectifier may decrease. In contrast, a load-independent class E rectifier retains the ZVS operation of switches of the rectifier from a no load condition, i.e. zero load, to a full load condition. In addition, the rectified voltage is relatively constant between the no load and full load conditions. The switching losses from the no load condition to the full load condition are approximately constant and efficiency is not generally not affected.

The class E rectifier design is adapted for converting the input RF power to DC. The operating or switching frequencies of the rectifier element 114 may be, for example, 13.56 MHz and 27.12 MHz. The rectified voltage or signal output by the rectifier element 114 is $V_{rect}$. The RF power input into the rectifier element 114 is $V_{in}$. In this embodiment, the rectified DC voltage, $V_{rect}$, is unregulated. As the rectifier element 114 comprises a load-independent rectifier, the switch-node waveform does not vary significantly with load as previously described. Thus, the rectified voltage is relatively stable.

The auxiliary DC/DC converter 118 is electrically connected to the gate driver 120, trigger circuit 122 and rectifier element 114. The converter 118 is for converting the $V_{rect}$ output by the rectifier element 114 to an auxiliary voltage range, e.g. in the range of 5V, $V_{aux}$, to power the trigger circuit 122 and gate driver 120. The auxiliary power voltage or signal $V_{aux}$ powers the trigger circuit 122 and gate driver 120. Until the auxiliary DC/DC converter 118 can regulate, the FET of the rectifier element 114 is off and the rectifier element 114 acts as a passive (diode) rectifier. In this embodiment, the auxiliary DC/DC converter 118 comprises a low-power buck converter.

The trigger circuit 122 is electrically connected to the gate driver 120, the auxiliary DC/DC converter 118 and the rectifier element 114. The trigger circuit 122 is powered by a signal, e.g. $V_{aux}$, from the auxiliary DC/DC converter 118. The trigger circuit 122 samples the RF power input $V_{in}$ received by the rectifier element 114 and produced an appropriately timed trigger voltage $V_{trig}$. The trigger voltage or signal $V_{trig}$ is timed such that a gate drive voltage or gate signal $V_{gate}$ output by the gate driver is in phase with the input $V_{in}$. The trigger circuit 122 is for ensuring proper timing of the gate drive voltage or gate signal $V_{gate}$ output by the gate driver 120. As will be described, the trigger circuit 122 is configured to provide a trigger signal $V_{trig}$ that recovers timing using the input signal $V_{in}$. In the illustrated arrangement, the trigger signal $V_{trig}$ comprises a pulse signal.

Ideally the rectifier element 114 is open when the incoming current is positive and closed when the incoming current is negative, resulting in proper rectification. Assuming perfect tuning, $V_{gate}$ should be in-phase with $V_{in}$.

The gate driver 120 is electrically connected to the rectifier element 114, the auxiliary DC/DC converter 118 and the trigger circuit 122. The gate driver 120 is powered by a signal (e.g. $V_{aux}$) from the auxiliary DC/DC converter 118. The gate driver 120 outputs a signal to switch the FET of the rectifier element 114. In particular, the gate driver 120 outputs a gate drive voltage or gate signal, $V_{gate}$, to control operation of the rectifier element 114, e.g. control switching of the FET of the rectifier element 114.

In this embodiment, the gate drive voltage $V_{gate}$ is a delayed and more powerful reproduction of the trigger voltage $V_{trig}$ input into the gate driver 120.

The gate driver 120 and the trigger circuit 122 exhibit non-negligible propagation delays. To address the challenge of the non-negligible propagation delays from the gate driver 120 and the trigger circuit 122, the trigger circuit 122 is designed such that the trigger circuit 122 further delays the output signal $V_{trig}$ to ensure $V_{gate}$ is synchronized with $V_{in}$.

Figure 4:
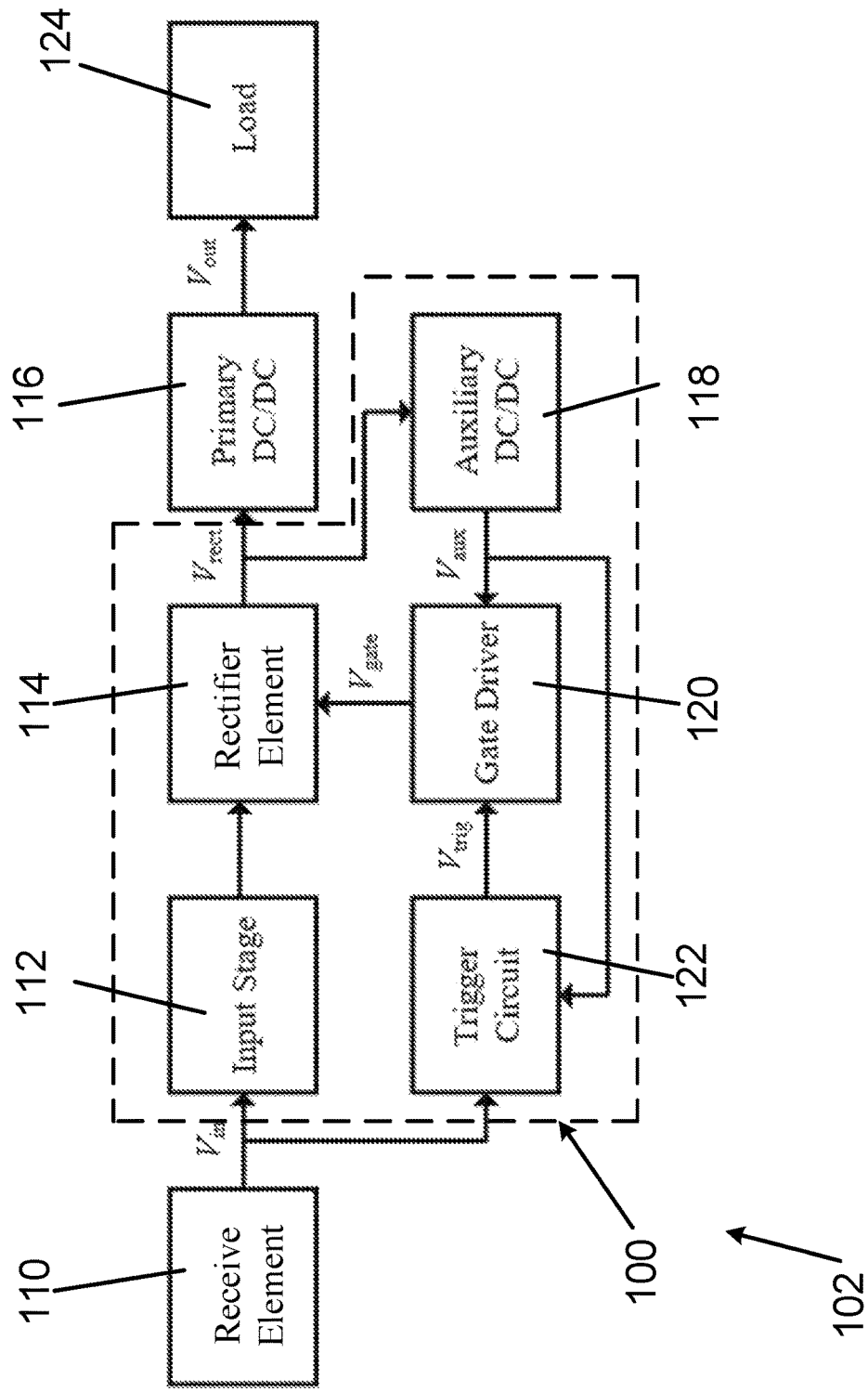
FIG. 4 is a block diagram of a receiver including a rectifier according to an aspect of the disclosure.

The rectifier 100 has been described in isolation. However, the rectifier 100 is for use in a receiver of a wireless power transfer system. An exemplary receiver 102 is shown in FIG. 4 including the rectifier 100.

The receiver 102 comprises a receive element 110, the rectifier 100, a primary DC/DC converter 116, and a load 124. The rectifier 100 comprises the rectifier element 114, the auxiliary DC/DC converter 118, the trigger circuit 122 and the gate driver 120. In the illustrated arrangement, the rectifier additionally comprises an input stage 112.

The receive element 110 is electrically connected to the input stage 112 and trigger circuit 122. The receive element 110 may be similar to the receive element 24. The receive element 110 is configured to receive power from a transmitter, e.g. transmitter 10, using resonant or non-resonant electric or magnetic field coupling. The receive element 110 may extract power from a transmitter via non-resonant or resonant magnetic or electric field coupling. As such, the receive element 110 comprises one or more receive coils (i.e. inductors) or one or more capacitive electrodes. The corresponding transmitter comprises corresponding transmit coils (i.e. inductors) or capacitive electrodes, respectively.

The receive element 110 extracts power from the transmitter and as such outputs an input voltage or signal $V_{in}$ which corresponds to the extracted power or signal.

The input stage 112 is electrically connected to the rectifier element 114, receive element 110 and trigger circuit 122. The input stage 112 is adapted to perform any combination of three functions. In particular, the input stage 112 is for converting the impedance presented by the rectifier element 114 under nominal loading to the optimal load impedance for the receive element 110. The input stage 112 is for reducing harmonic content generated by the nonlinear action of the rectifier element 114 such that the receiver 102, and by extension, the wireless power system that the receiver 102 forms a part of, may meet international product requirements relating to electromagnetic compatibility (EMC). The input stage 112 is for ensuring that current input into the rectifier element 114 is approximately sinusoidal.

In this embodiment, the input stage 112 comprises a low pass implementation of a double impedance inverter circuit. The input stage 112 further comprises additional filtering added in series with the rectifier element 114. The use of the double impedance inverter topology may beneficially ensure the rectifier element 114 is driven by a quasi-constant voltage source. Further details of the input stage 112 are described below.

The rectifier element 114 is electrically connected to the input stage 112, the gate driver 120, the primary DC/DC converter 116 and the auxiliary DC/DC converter 118. The rectifier element 114 has been previously described.

The primary DC/DC converter 116 is electrically connected to the rectifier element, auxiliary DC/DC converter 118 and load 124. The primary DC/DC converter 116 is for receiving the DC power signal output from the rectifier element 114, $V_{rect}$. The primary DC/DC converter 116 interfaces the rectifier element 114 to the load 124. The primary DC/DC converter 116 is for converting the received DC power signal. The converted DC power signal is output from the primary DC/DC converter 116 to the load 124.

The auxiliary DC/DC converter 118 is additionally electrically connected to the primary DC/DC converter 116. The auxiliary DC/DC converter 118 has been previously described.

The gate driver 120 has been previously described.

The load 124 is electrically connected to the primary DC/DC converter 116. The load 124 receives the signal output by the primary DC/DC converter 116, $V_{out}$. The load 124 may be variable. As one of skill in the art will appreciate, the load 124 may be directly connected to the rectifier element 114 and received $V_{rect}$ if DC conversion is not required.

While the receiver 102 has been described as comprising the input stage 112 and primary DC/DC converter 116, one of skill in the art will appreciate that other configurations are possible. In particular, the receiver 102 may not comprise either one or both of the input stage 112 and the primary DC/DC converter 116.

The trigger circuit 122 is electrically connected to the receive element 110 and the input stage 122. As previously described, to address the challenge of the non-negligible propagation delays from the gate driver 120 and the trigger circuit 122, the trigger circuit 122 is designed such that the trigger circuit 122 further delays the output signal $V_{trig}$ to ensure $V_{gate}$ is synchronized with $V_{in}$.

In order to determine the requirements of the trigger circuit 122 to at least partially address these non-negligible propagation delays, at least some of the described components have been schematically modelled.

Figure 5:
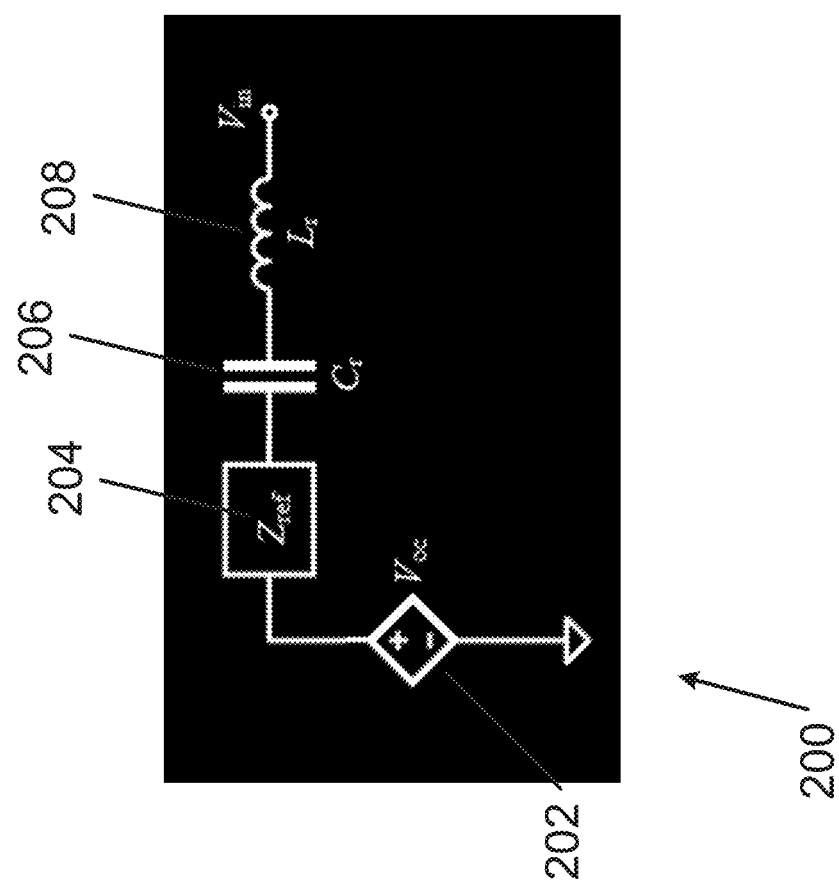
FIG. 5 is a schematic diagram of a model of a receive element of a receiver of a wireless power transfer system.

In particular, the receive element 110 has been modelled using a Thevenin equivalent circuit 200. As shown in FIG. 5, the circuit 200 comprises a voltage source 202, a series impedance 204 having an impedance $Z_{ref}$ which is small and resistive at the operating frequency, a capacitor 206 having a capacitance $C_r$, and an inductor 208 having an inductance $L_r$. This model is based on both the transmit element and receive element 110 being well-tuned, exhibiting high unloaded quality factors and being well-coupled. In other words, the power transfer efficiency across the wireless gap (the space between the transmit element and the receive element 110, across which power is transferred from the transmit element to the receive element 110) is high (>90%). As a result, the input voltage $V_{in}$ is a clean sinusoid which is relatively constant as the load 124 changes. Thus, the input voltage is relatively load-independent.

The series impedance 204, capacitor 206, and inductor 208 may form tuning elements which ensure resonance at the switching frequency of the receive element 110 and a corresponding transmit element of a transmitter of a wireless power transfer system. As one of skill in the art will appreciate, only of the impedance 204, capacitor 206, and inductor 208 may be present.

Only a single-ended half-circuit is shown for convenience. The other half circuit is assumed to be identical, but with a 180° phase shift on the open-circuit voltage, implying perfect balance.

The induced single-ended open-circuit voltage, $V_{oc}$, is referenced to this signal return. The reflected impedance, $Z_{ref}$, represents loading by the transmit element. Assuming perfect transmit-side tuning, this can be expressed in equation (1) as:

$$Z_{ref} = \frac{1}{2}\left(\frac{(X_{21})^2}{R_s + R_t}\right) \quad (1)$$

where $X_{21}$ embodies the mutual coupling between the transmit and receive element, $R_s$ represents the Norton-equivalent source resistance exhibited by the transmit element and $R_t$ represents the loss resistance of the transmit element. The equivalent capacitance of the circuit 200 is denoted as $C_r$ and resonates with the attached inductance $L_r$ at the switching frequency when power is extracted by the receive element 110 primarily via electric or resonant electric field induction. As a result, the circuit 200 of the receive element 110 reduces to a sinusoidal voltage source and series resistance at the switching frequency. When power is extracted by the receive element 110 primarily via magnetic or resonant magnetic field induction, an inductor resonates with an attached capacitor at the switching frequency.

Example circuit parameters at 27.12 MHz might be: $V_{oc}$=36 $V_{rms}$; $Z_{ref}$=2.5Ω; Cr=16.4 pF, and $L_r$=2.1 μH with an equivalent series resistance of approximately 1.2Ω.

Figure 6:
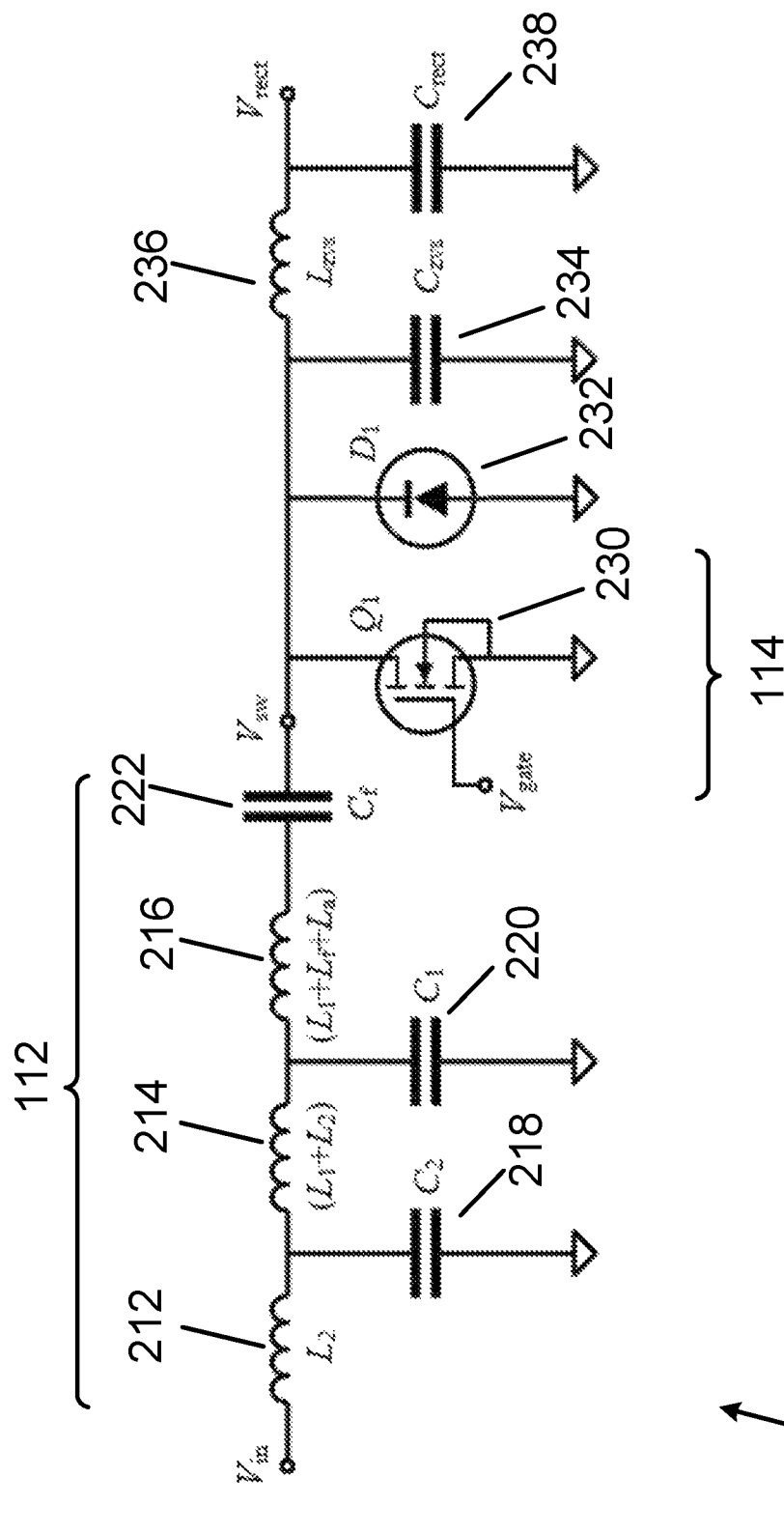
FIG. 6 is a schematic diagram of a portion of a rectifier according to an aspect of the disclosure.

Turning now to FIG. 6, a schematic diagram of a portion of the rectifier 100 is shown. The schematic diagram illustrates an exemplary design of a power path of the rectifier 100. As with circuit 200, only a single-ended half-circuit 210 is shown.

The input stage 112 is electrically connected to the receive element 110 and the rectifier element 114. The input stage 112 receives an input voltage (Vin) from the receive element 110. As previously stated, the input stage 112 comprises a double impedance inverter circuit. The double impedance inverter circuits is configured to adapt the impedance, reduce harmonics and ensure the current is sinusoidal. The phase of the input voltage ($V_{in}$) is fixed and may be relied upon by the rectifier element 114. Without the double impedance inverter circuit of the input stage 112, the phase varies with variations in the load. As such, the efficiency of the rectifier 100 may decrease. In the illustrated arrangement, the phase of the input voltage ($V_{in}$) is fixed and can be relied upon by the rectifier element 114. Without the double impedance inverter circuit of the input stage 112, the phase would vary with variations in the load and efficiency of the rectifier 100 may decrease. In the illustrated arrangement, the double impedance inverter circuit comprises inductors 212, 214, 216 and capacitors 218, 220, 222. The inductance of inductor 212 is given by $L_2$, the inductance of inductor 214 is given by inductance $L_1+L_2$, and the inductance of inductor 216 is given by $L_1+L_f+L_a$. The capacitance of capacitor 218 is given by capacitance $C_2$, the capacitance of capacitor 220 is given by capacitance $C_1$, and the capacitance of capacitor 222 is given by capacitance $C_f$.

The circuit 210 further comprises a FET ($Q_1$) 230 of the rectifier element 114, a diode ($D_1$) 232, a capacitor 234 and a shunt capacitor 238 all connected in parallel to the input stage 112. An inductor 236 is connected in series between capacitor 234 and shunt capacitor 238. The capacitance of the capacitor 234 is given by capacitance $C_{ZVS}$, and the capacitance of the shunt capacitor 238 is given by capacitance $C_{rect}$. The inductance of the inductor 236 is given by inductance $L_{ZVS}$.

Circuit parameters $L_1$, $C_1$, $L_2$ and $C_2$ are associated with double impedance inversion. The inductor/capacitor ($L_1$, $C_1$) and ($L_2$, $C_2$) pairs resonate at the switching frequency. The input impedance of the rectifier element 114 is given by $Z_{rect}$. Thus, at the switching frequency, $Z_{rect}$ is given by equation (2):

$$Z_{in} \cong Z_{rect}\left(\frac{C_1}{C_2}\right)^2 \quad (2)$$

where $Z_{in}$ is input impedance of the receive element 110. Assuming the rectifier element 114 is perfectly tuned, at nominal load $Z_{rect}$ and $Z_{in}$ will be resistive. Optimal loading of the receive element 110 can then be achieved through adjustment of the capacitance ratio.

Additional filtering of a current input into the rectifier element 114 is achieved via (Lf, Cf), which are also resonant at the switching frequency. Assuming the current is approximately sinusoidal, the equations (3) and (4) can be applied to achieve load-independence and ZVS:

$$1.2915\omega_0 = \frac{1}{\sqrt{L_{ZVS}(C_{ZVS} + C_j + C_{oss})}} \quad (3)$$

$$L_a = 0.2663 L_{ZVS} \quad (4)$$

where ω0 is the switching frequency in radians, Cj is the junction capacitance of the diode 232 (D1), Coss is the output capacitance of the FET 230 (Q1) of the rectifier element 114, and La is the additional series inductance required for proper ZVS.

Assuming an output voltage on the order of 25 V, (Coss+ Cj)≈250 pF, which tends to limit ZVS tuning options, and at an operating frequency of 13.56 MHz, the following parameters were determined based on the above equations: Lzvs=140 nH, resulting in Czvs≈340 pF and La=37.3 nH. While at an operating frequency 27.12 MHz, the following parameters were determined based on the above equations: Lzvs=66 nH, resulting in Czvs≈63 pF and La=17.6 nH. Ideally, Czvs would always be larger than (Coss+Cj) to better stabilize the circuit of the rectifier 200, but this may be more difficult to achieve as the switching frequency increases.

Filtering of the rectified output voltage is achieved using a shunt capacitor 238 with a capacitance of Crect. Additional filtering may be required to meet EMC requirements.

In another embodiment, the rectifier element 114 and primary DC/DC converter 116 may occupy the same printed circuit board (PCB). This may allow the output filtering of the rectifier element 114 and input filtering of the primary DC/DC converter 116 to be combined.

Figure 7:
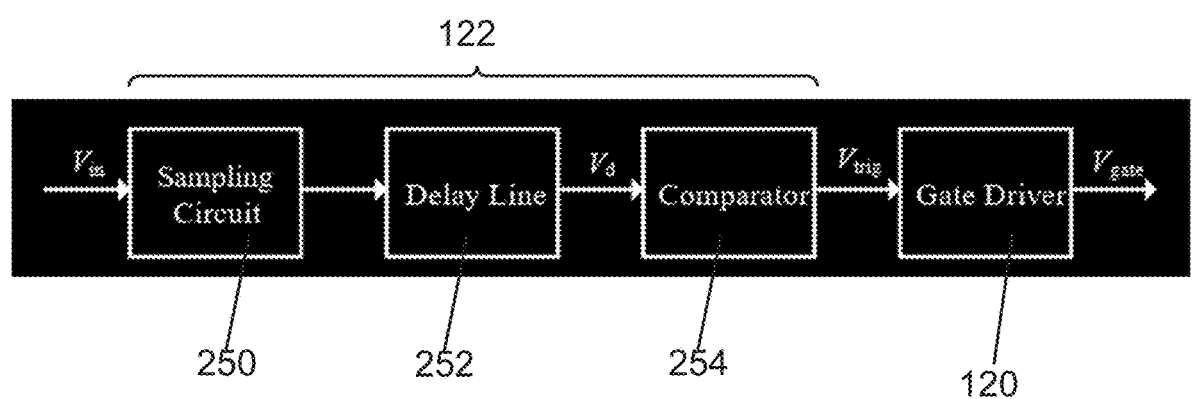
FIG. 7 is a block diagram of a portion of a rectifier according to an aspect of the disclosure.

Turning now to FIG. 7, a block diagram of a portion of the rectifier 100. Specifically, a block diagram of the trigger circuit 122 and gate driver 120 is shown. As shown in FIG. 7, the input voltage or signal $V_{in}$ is sampled via a sampling circuit 250 and fed to a delay line 252. In this embodiment, the sampling circuit 250 is a voltage divider, and the delay line 252 is a lumped element delay line circuit. The output of the delay line 252 is fed to a comparator circuit 254. The comparator circuit 254 is for generating a clock signal by comparing the delayed signal ($V_d$) output by the delay line 252 to a DC level.

The resulting trigger voltage ($V_{trig}$) is fed to the gate driver 120. The gate driver 120 converts the trigger voltage to a suitable waveform ($V_{gate}$) for driving the FET of the rectifier element 114. Both the comparator circuit 254 and the gate driver 120 have propagation delays on the order of nanoseconds, which can be significant when dealing with switching periods of roughly 73.7 ns (for an operating frequency of 13.56 MHz) or 36.9 ns (for an operating frequency 27.12 MHz). The sampling circuit 250, delay line 252 and comparator 243 form the trigger circuit 122. These elements are designed to ensure that $V_{gate}$ is synchronized with $V_{in}$.

Figure 8:
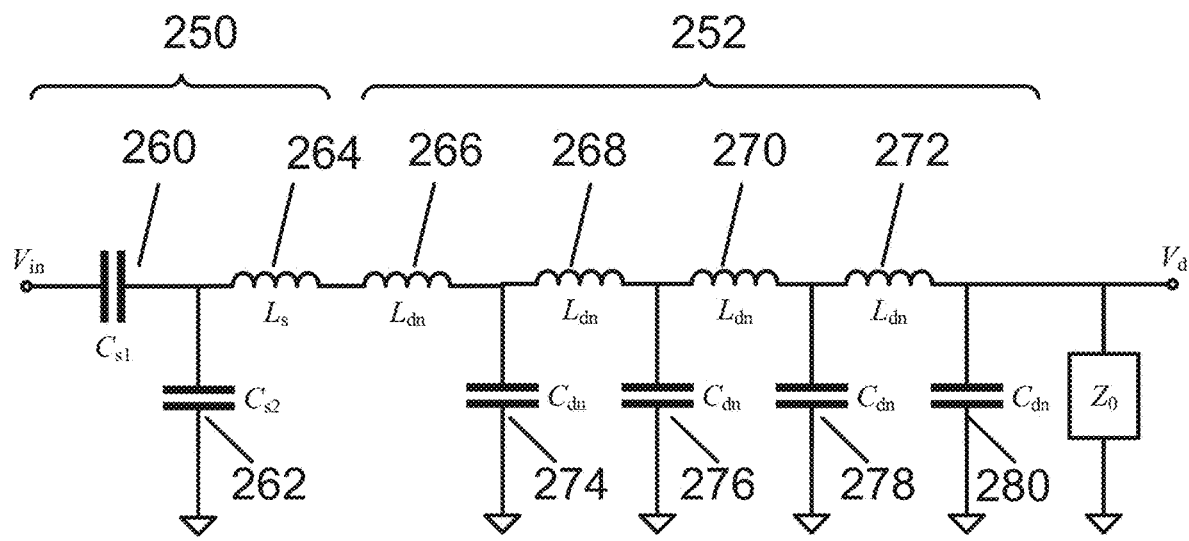
FIG. 8 is a schematic diagram of a portion of a rectifier according to an aspect of the disclosure.

Turning now to FIG. 8, a schematic diagram of a portion of the rectifier 100 is shown. The schematic diagram illustrates an exemplary arrangement of the sampling circuit 250 and the delay line 252. As previously stated, in this embodiment, the sampling circuit 250 is a voltage divider, and the delay line 252 is a lumped element delay line circuit.

In particular, the sampling circuit 250 comprises of a capacitive voltage divider comprising a capacitor 260 with capacitance Cs1 and capacitor 262 with capacitance $C_{s2}$, and an inductor 264 with an inductance ($L_s$) to cancel the associated capacitive reactance. The capacitor 260 is connected in series with the inductor 264, while the capacitor 262 is connected in parallel between the capacitor 260 and inductor 264.

In the illustrated arrangement, the delay line 252 comprises a four-stage lumped-element transmission line circuit which implements the delay. The total inductance and capacitance associated with the line, denoted by Ld and Cd, respectively, are split evenly among the inductors (266, 268, 270, 272) and capacitors (274, 276, 278, 280) making up four segments of the delay line 252. The capacitors 274, 276, 278, 280 are connected in parallel with the inductors 266, 268, 270, 272 between adjacent capacitors 274, 276, 278, 280. The inductor 264 of the sampling circuit 250 is electrically connected to the inductor 266 of the delay line 252. Assuming the delay line 252 is match-terminated, the associated time delay is given by equation (5):

$$\tau_d = \sqrt{L_d C_d} \quad (5)$$

If it is further assumed that the line is lossless, the characteristic impedance ($Z_o$) is given by equation (6):

$$Z_0 = \sqrt{\frac{L_d}{C_d}} \quad (6)$$

As a result, once the characteristic impedance ($Z_o$) and total delay ($\tau_d$) are selected, the values of $L_{dn}$ and $C_{dn}$ for the four-stage delay line 252 can be determined by equation (7):

$$L_{dn} = \frac{Z_0 \tau_d}{4}, \quad C_{dn} = \frac{\tau_d}{4 Z_0} \quad (7)$$

While a particular delay line 252 has been described, one of skill in the art will appreciate that other configurations are possible. In another embodiment, the delay line comprises more stages than a four-stage lumped-element transmission line circuit to implement a delay. In particular, more than four stages may be used for lower switching frequencies. In another embodiment, the delay line comprises fewer stages, e.g. a three-stage lumped-element transmission line. Fewer stages may be used for higher switching frequencies. Each segment of a delay with more or fewer than four stages may accordingly account for less or more than one tenth of a wavelength, respectively.

While separator inductors 264 and 266 have been described in the sampling circuit 250 and delay line 252, respectively, have been illustrated, one of skill in the art will appreciate that other arrangements are possible. In another embodiment, the inductors 264, 266 may be shared or lumped together into a single inductor with an inductance of $L_s + L_{dn}$. In this embodiment, a portion of the single inductor is used by the sampling circuit 250 and a portion is used by the delay line 252.

Figure 9:
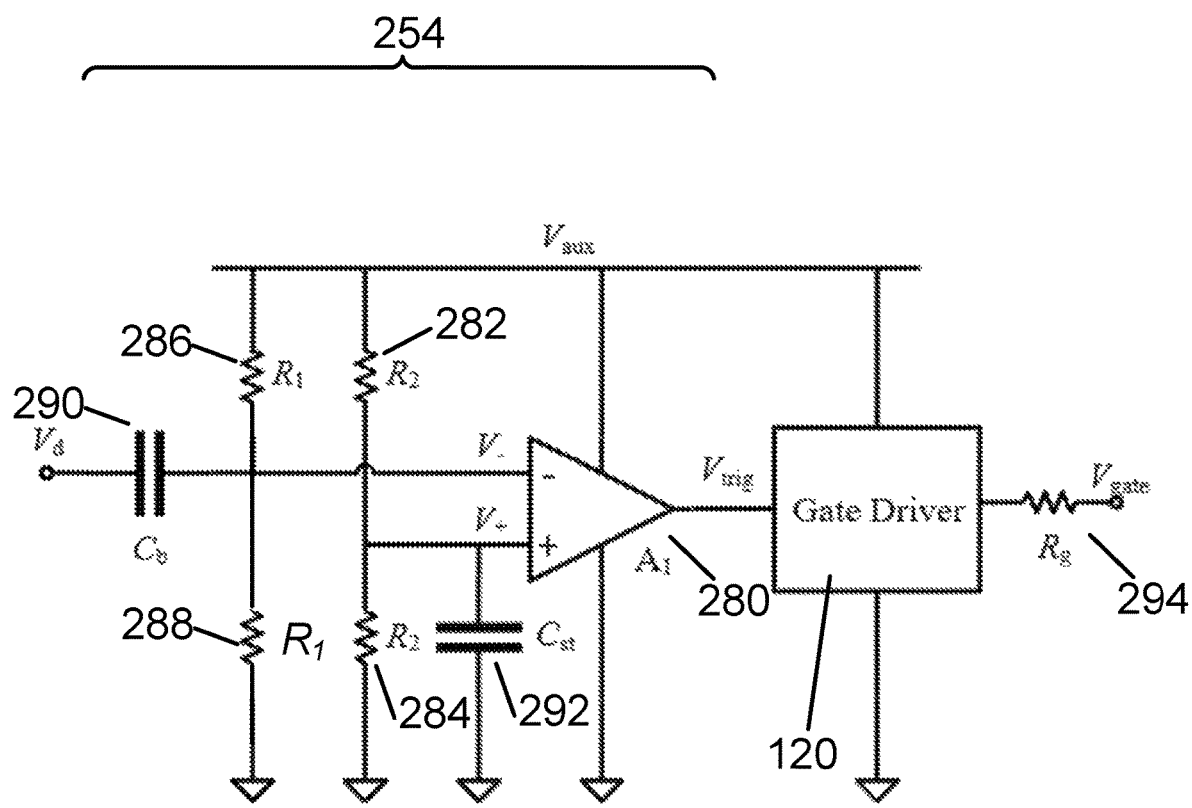
FIG. 9 is a schematic diagram of a portion of a rectifier according to an aspect of the disclosure.

Turning now to FIG. 9, a schematic diagram of another portion of the rectifier 100 is shown. The schematic diagram illustrates an exemplary arrangement of the comparator circuit 254 and the gate driver 120. As previously stated, the comparator circuit 254 is for generating a clock signal by comparing the delayed signal ($V_d$) output by the delay line 252 to a DC level.

As shown in FIG. 9, the comparator circuit 254 comprises a comparator 280 ($A_1$) is powered from the auxiliary supply having an auxiliary supply voltage ($V_{aux}$). The inputs of the comparator 280 are biased to roughly half of $V_{aux}$. For the positive comparator input ($V_+$) this is achieved using two equal-valued resistors 282, 284, each with resistance of $R_2$. The negative comparator input (V) this is achieved using two equal-valued resistors 286, 288, each with resistance of $R_1$.

The delayed voltage signal ($V_d$) output by the delay line 252 is coupled to the negative comparator input ($V_-$) via DC blocking capacitor 290 having a capacitance of ($C_b$) thus the trigger voltage ($V_{trig}$) will be inverted (180° out-of-phase) relative to the delayed voltage signal ($V_d$). In terms of the total delay required to ensure that $V_{gate}$ is in-phase with $V_{in}$, this effectively accounts for half of the switching period, thus reducing the burden on the delay line 252. As a result, the total delay ($\tau_d$) is given by equation (8) as:

$$\tau_d = \frac{T_s}{2} - (\tau_c + \tau_g) \quad (8)$$

where $T_s$ is the switching period, is the propagation delay of the comparator 254 and $\tau_g$ is the propagation delay of the gate driver 120.

The output of the gate driver 120 is connected to a resistor 294 which has a resistance $R_g$ to provide the gate signal $V_{gate}$ to the rectifier element 114.

On start-up, the output voltage Vout will be less than the turn-on voltage of the auxiliary DC/DC converter 118 as the FET 230 of the rectifier element 114 is off and the diode 232 is performing rectification. As the output voltage Vout exceeds this turn-on voltage, Vaux will start rising to its nominal value. The presence of capacitor 290 will have the effect of slowing the rise time of negative input V− to the comparator 280. Unless similar capacitive loading is applied to the positive input V+ of the comparator 280, there may be a significant time interval during which it exceeds the negative input V− and thus the trigger voltage Vtrig will be high. This may de-stabilize the rectifier 200 and cause damage to the FET 230. Accordingly, a shunt capacitor, 292 which has a capacitance $C_{st}$ is added to the positive input V+ to ensure that negative input voltage V− is greater than the positive input voltage V+ during start-up. This capacitance $C_{st}$ of the shunt capacitor 292 is chosen to be at least twice the capacitance $C_b$ of the blocking capacitor 290. In an exemplary arrangement, if $C_b$ is 200 nF, $C_{st}$ may be 470 nF.

Experimental designs for the receiver 102 comprising the rectifier 100 were built and tests were conducted on these experimental designs as part of a complete wireless power transfer system comprising the receiver 102.

Operating or switching frequencies of 13.56 MHz and 27.12 MHz were considered for the rectifier 100. A set of printed circuit boards (PCBs) was developed for each frequency using the trigger circuit 122 circuit schematic discussed. Once the rectifier elements 110 were tuned, the rectifier elements 114 were tested as part of a complete wireless power transfer system. A set of 100 Ω resonator pairs employing custom electrode PCBs and solenoidal air core inductors were used to implement the wireless links between the transmit element and receive element 110 of the wireless power transfer system.

Furthermore, in the experimental design for the operating frequency of 13.56 MHz, each of the inductors 212, 214, 216, 236 had a Q in the order of 300. This may result in high RF efficiency.

In the experimental design for the operating frequency of 27.12 MHz, the inductors 214, 216, 236 used were air-core inductors. These are generally lower cost than the custom-wound inductors and may exhibit better tolerances. However, the associated quality factors (Q) are generally on the order of 150, and accordingly lower than the custom wound inductors.

Accordingly, in the experimental designs, the design operating at 27.12 MHz may be less efficient due to increased RF and switching losses when compared with the design operating at 13.56 MHz, but the design operating at 27.12 MHz may be lower cost and have a reduced manufacturing time.

On the transmitter side of the experimental wireless power transfer system, a transmitter PCB was tuned for each frequency. As with the receive element 110, RF and switching losses are predicted to be lower at 13.56 MHz, while at 27.12 MHz the transmit element may be lower cost and more straightforward to manufacture.

The transmitter PCB employed for testing had been previously modified such that the primary on-board DC/DC could accommodate higher output voltages. To achieve the desired power levels, the transmitter PCB was powered from 28 V and the nominal DC/DC output voltage, or inverter input voltage, was 25 V. The transmitter PCB was powered from 28 V and with a nominal inverter input voltage of 25 V.

In the experimental designs, the primary DC/DC converter 116 of the receiver 102 was configured for approximately 12.6 V output. Loading of the wireless power transfer system was achieved using an electronic load in constant current mode.

In the experimental designs, the rectifier element 114 was designed for an output signal of 80 W in order to readily accommodate a load power of up to 70 W.

In the experimental designs, the comparator 280 exhibited a propagation delay of approximately 4.5 ns. The gate driver 120 exhibited a propagation delay of approximately 2.5 ns.

At an operating frequency of 13.56 MHz, this translates to a nominal time delay (τd), according to the equations given above, of approximately 29.87 ns, while at an operating frequency of 27.12 MHz the nominal time delay (τd) is 11.44 ns. At both frequencies, each segment of the delay line 252 is accounting for less-than-or-equal-to one-tenth of a wavelength as desired.

Experimental results are now presented for the described wireless power transfer system comprising the receiver 102 comprising the rectifier 100. In this experimental wireless power transfer system design the operating frequency was 13.56 MHz.

Figure 10:
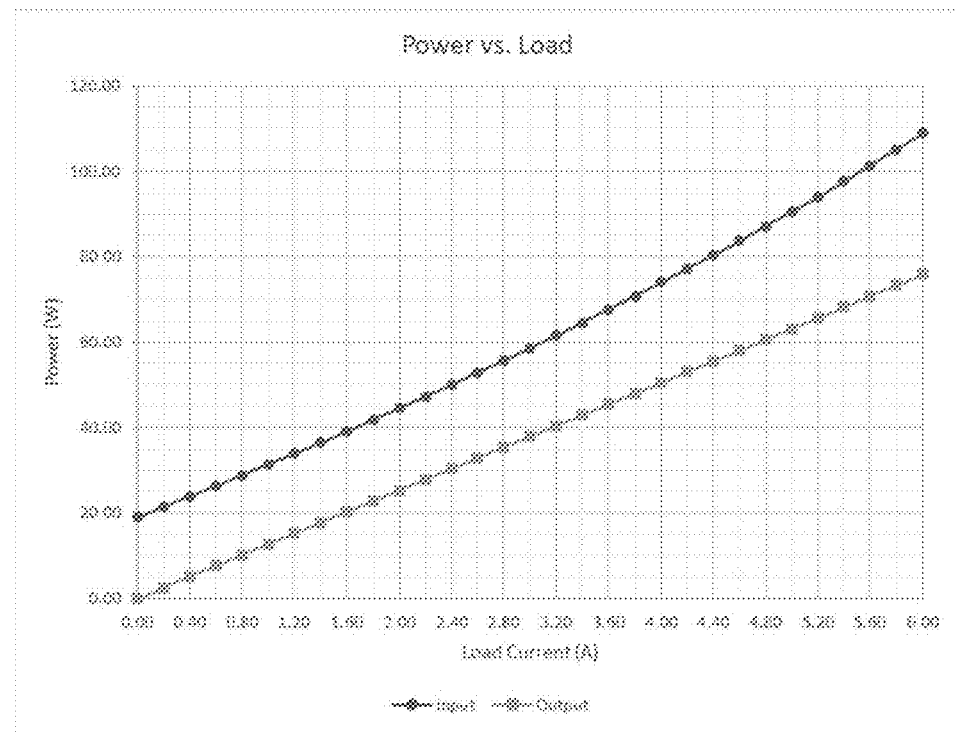
FIG. 10 is a graph of input and output power versus load current of an experimental design of a wireless power transfer system comprising a rectifier according to an aspect of the disclosure.

During testing, the inverter input voltage of the transmitter was first increased to 25 V, then the load current was increased from 0-6 A in 0.2 A steps. Turning now to FIG. 10, a graph of input and output power versus load current of an experimental design of a wireless power transfer system comprising the rectifier 100 with the values described above.

As shown in FIG. 10, at no-load, roughly 19 W are required to energize the wireless power transfer system. The nominal output power of 70 W is achieved when the load current is 5.6 A, but the wireless power transfer system operates at a current of 6 A without any complications.

Figure 11:
FIG. 11 is a graph of power transfer efficiency versus load current of the experimental design.

Turning now to FIG. 11, power transfer efficiency versus load current for the experimental wireless power transfer system is depicted. In this experimental design the operating frequency was 13.56 MHz. The power transfer efficiency is calculated from the transmitter to the receiver, i.e. end-to-end. The power transfer efficiency is given by dividing the output and input DC power results. As shown in FIG. 11, the efficiency rises from zero at 0 A (as expected), to above 50% at 1.6 A, to approximately 60% at 2.4 A and settling to approximately 70% between 5 and 6 A of load current. The efficiency of the transmit element and receive element 110 was previously measured at approximately 92%. Thus, the peak efficiency of the end-to-end electronics including the rectifier 100 is roughly 76%.

Figure 12:
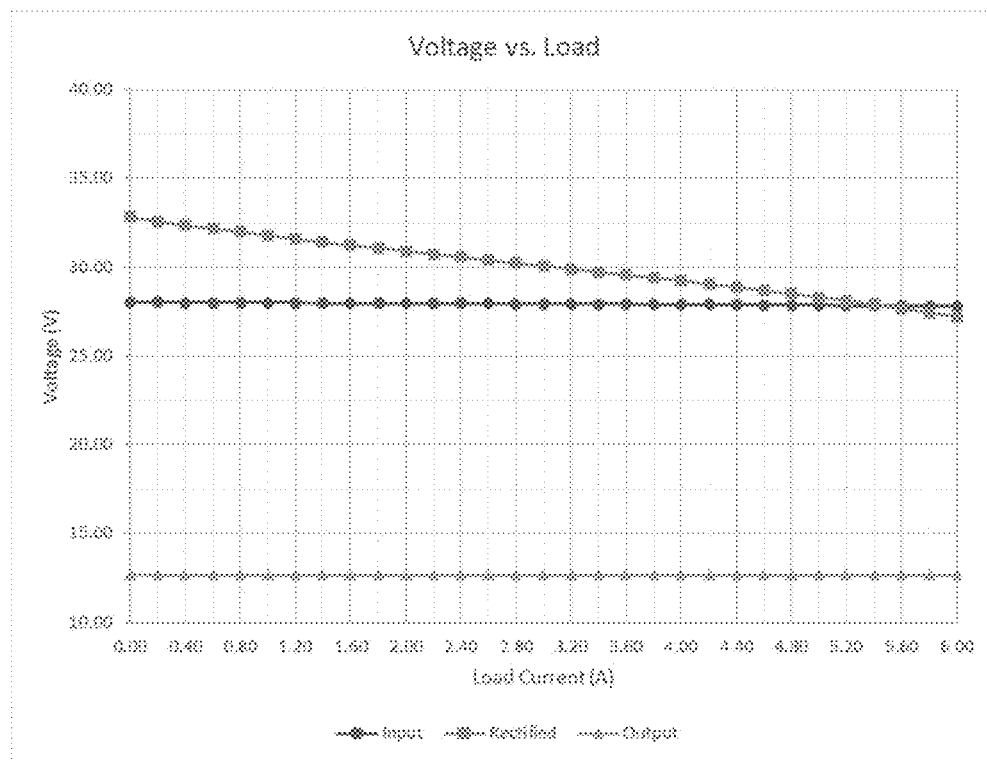
FIG. 12 is a graph of input, output and rectified voltages versus load current of the experimental design.

Turning now to FIG. 12, input, output and rectified voltages versus load current for the experimental wireless power transfer system is depicted. As shown in FIG. 12, the input voltage ($V_{in}$) and output voltage ($V_{out}$) are generally stable with a load at approximately 28 V and 12.6 V, respectively.

The rectified voltage ($V_{rect}$) with load is generally stable which is beneficial for system stability. Furthermore, as the rectified voltage is unregulated the wireless transfer system is shown to be particularly stable and robust. The rectified voltage is approximately 32.8 V at no-load (load current of 0 A) and decreases linearly to approximately 27.2 V at load current of 6 A. A drop of only 5.6 V (~18%) is significantly more stable than what might be expected with prior art passive rectification (~30%).

It is also possible to operate the rectifier 100 at much lower rectified output voltages compared with passive rectifiers, higher voltages are often required to reduce current stress on the diodes, which may put additional burden on the primary DC/DC converter 116.

Figure 13:
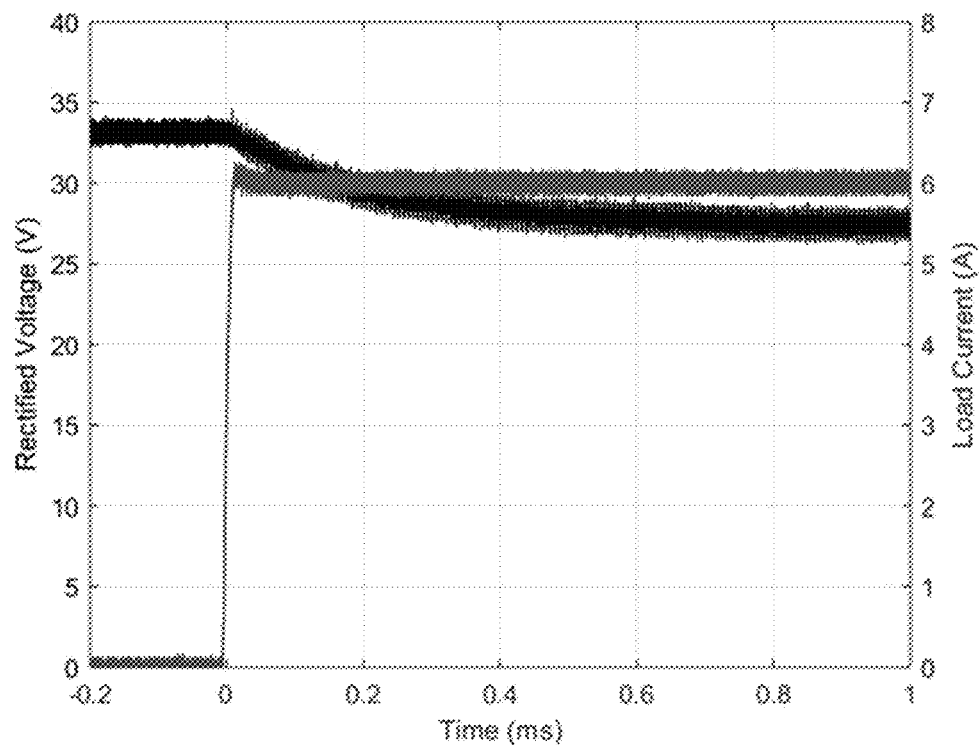
FIG. 13 is a graph of the response of a rectified voltage to a load step in the experimental design.

Turning now to FIG. 13, a graph of the response of the rectified voltage ($V_{rect}$) to a load step in the experimental wireless power transfer system is depicted. FIG. 13 shows the performance of the rectifier 100 under load step-changes. This may be particularly relevant in the context of evaluating the stability of timing recovery under dynamic conditions. To simulate load-step changes, the electronic load was configured to step from 0 to 6 A in approximately 20 μs (0.3 A/μs). The dynamic response to this this load step is shown in FIG. 13.

The load current is initially at 0 A. At time 0 ms, the load current increases relatively instantaneously to approximately 6 A. This represents the load step. The load current is then constant from time 0 ms to time 1 ms at 6 A. Prior to the load current stepping or increasing to 6 A, the rectified voltage ($V_{rect}$) is approximately 32.8 V at time −0.2 ms. At time 0 ms when the load current increases or steps up, the rectified voltage ($V_{rect}$) begins a gradual decrease or decay to 27.2 V over 800 µs. The rectified voltage ($V_{rect}$) settles at 27.2 V where it remains at time 1 ms.

As shown in FIG. 13, although the load current rises very quickly, the rectified voltage ($V_{rect}$) decays from 32.8 V to 27.2 V gradually over approximately 800 µs. As shown in FIG. 13, the response of the rectified voltage is relatively smooth and controlled.

Figure 14:
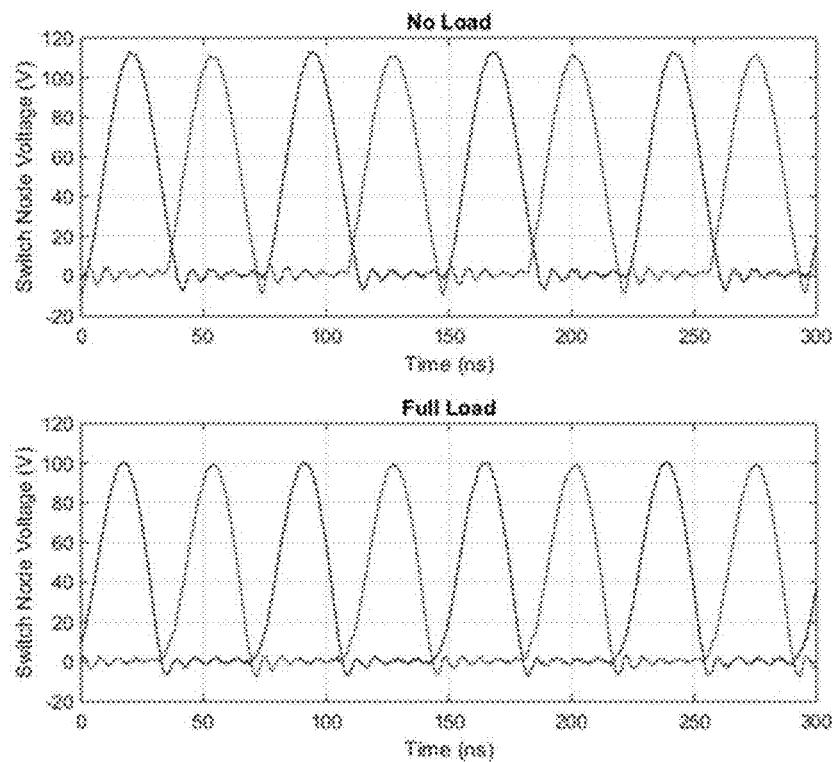
FIG. 14 are graphs of rectifier switch node voltages before and after loading of the experimental design.

Turning now to FIG. 14, graphs of rectifier switch node voltages before and after loading of the experimental wireless power transfer system are depicted. As shown in FIG. 14, the waveform of the switch node voltages is broader, and the peaks are reduced by approximately 10% after loading. However, while the shape of the switch node voltages changes slightly before and after loading, the rectifier 100 is shown to be stable, and load-independence is observed over a significant step change. Similar switch node voltage behaviour was present in the transmitter of the experimental wireless power transfer system.

In contrast, for passive rectification, the inverter switch nodes often change noticeably with load, an effect which is attributed to the non-negligible and non-linear junction capacitances of the diodes. This essentially translates to a significant phase-shift in the receiver input impedance with load. The fact that this does not occur with the rectifier 100 implies that the rectifier 100 presents a largely real impedance from no-load to full-load. As a result, inverter ZVS tuning can be better optimized in terms of efficiency.

Experimental results are now presented for the described wireless power transfer system comprising the receiver 102 comprising the rectifier 100. In this experimental wireless power transfer system design the operating frequency was 27.12 MHz.

Due to increased switching losses and the resulting thermal stresses applied to the FET 230 and gate driver 120, the rectifier 100 was designed for half the power compared with the rectifier 100 of wireless power transfer system operating at 13.56 MHz system. Thus, the wireless power transfer system operating at 27.12 MHz is optimized for an output power of 40 W to readily accommodate a nominal load power of 35 W. Another transmitter optimized for the switching or operating frequency of 27.12 MHz was used. The transmitter was powered from 24 V and with a nominal inverter input voltage of 18 V.

Figure 15:
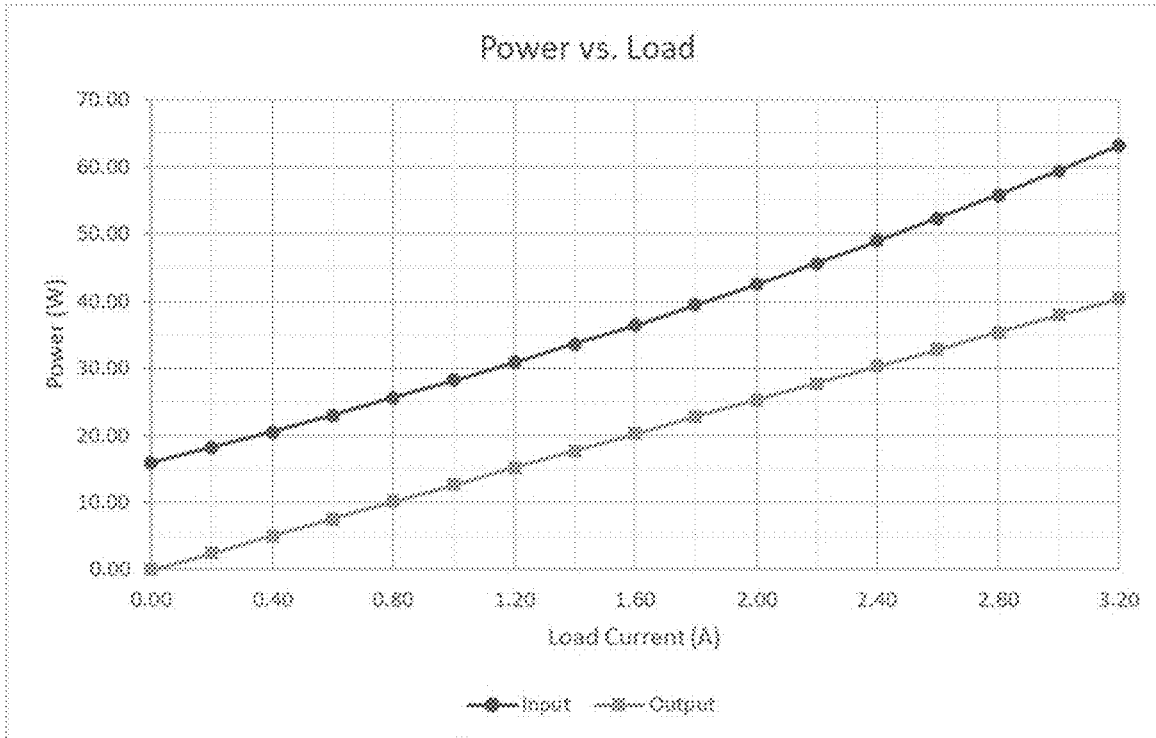
FIG. 15 is a graph of a graph of input and output power versus load current of another experimental design of a wireless power transfer system comprising a rectifier according to an aspect of the disclosure.

During testing, the inverter input voltage of the transmitter was first increased to 18 V, then the load current was increased from 0-3.2 A in 0.2 A steps. Turning now to FIG. 15, a graph of input and output power versus load current of an experimental design of a wireless power transfer system comprising the rectifier 100 with the values described above.

As shown in FIG. 15, at no-load, roughly 16 W are required to energize the wireless power transfer system. The nominal output power of 35 W is achieved when the load current is 2.8 A, but the wireless power transfer system operates at a current of 3.2 A without any complications.

Figure 16:
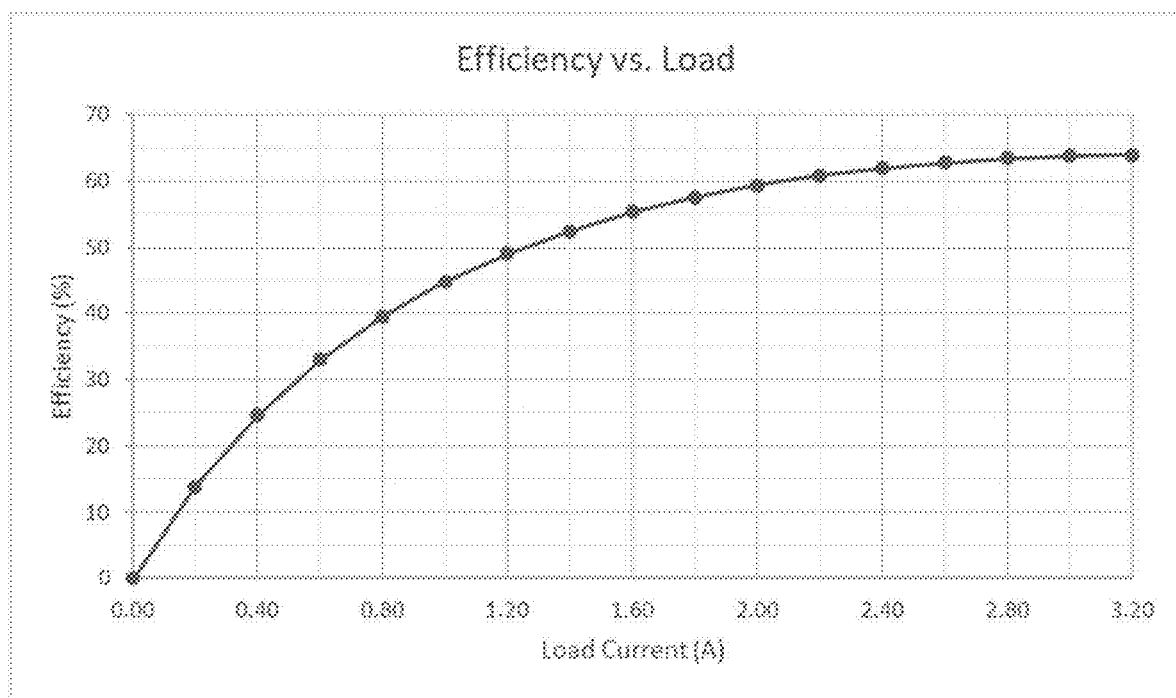
FIG. 16 is a graph of power transfer efficiency versus load current of the other experimental design.

Turning now to FIG. 16, power transfer efficiency versus load current for the experimental wireless power transfer system is depicted. As previously stated, in this experimental design the operating frequency was 27.12 MHz. The power transfer efficiency is calculated from the transmitter to the receiver, i.e. end-to-end. The power transfer efficiency is given by dividing the output and input DC power results. As shown in FIG. 16, the efficiency rises from zero at 0 A (as expected), to approximately 50% at 1.2 A, to approximately 60% at 2 A and peaks to approximately 64% at 3.2 A of load current. The efficiency of the transmit element and receive element 110 was previously measured at approximately 95%. Thus, the peak efficiency of the end-to-end electronics including the rectifier 100 is roughly 68%.

Several factors may explain the 8% difference between this and the 13.56 MHz system: all switching losses will be approximately doubled; the reduced power levels increase the impact of quiescent draw, and, perhaps most significantly, RF inductor losses will be 2-3 times higher due to the use of off-the-shelf air coils as opposed to custom-wound toroids.

Figure 17:
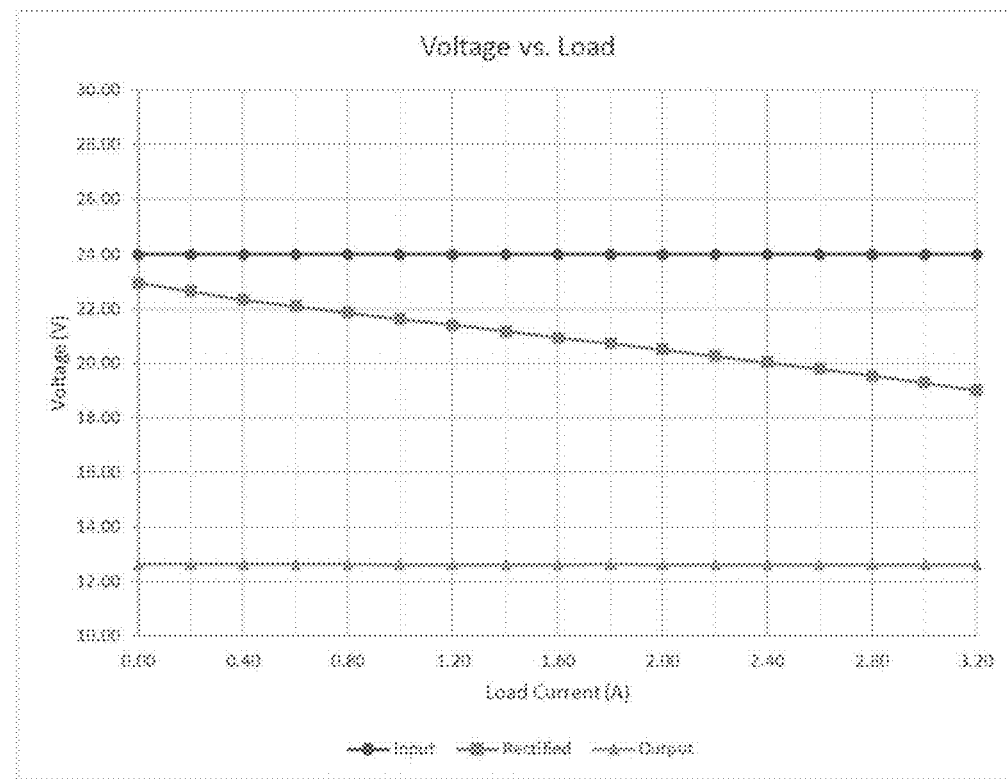
FIG. 17 is a graph of input, output and rectified voltages versus load current of the other experimental design.

Turning now to FIG. 17, input, output and rectified voltages versus load current for the experimental wireless power transfer system is depicted. As shown in FIG. 17, the input voltage ($V_{in}$) and output voltage ($V_{out}$) are generally stable with a load at approximately 24 V and 12.6 V, respectively.

The rectified voltage ($V_{rect}$) with load is generally stable which is beneficial for system stability. Furthermore, as the rectified voltage is unregulated the wireless power transfer system is shown to be particularly stable and robust. The rectified voltage is approximately 23 V at no-load (load current of 0 A) and decreases linearly to approximately 19 V at load current of 3.2 A. A drop of only 4 V (~17%) is significantly more stable than what might be expected with prior art passive rectification (~30%).

Figure 18:
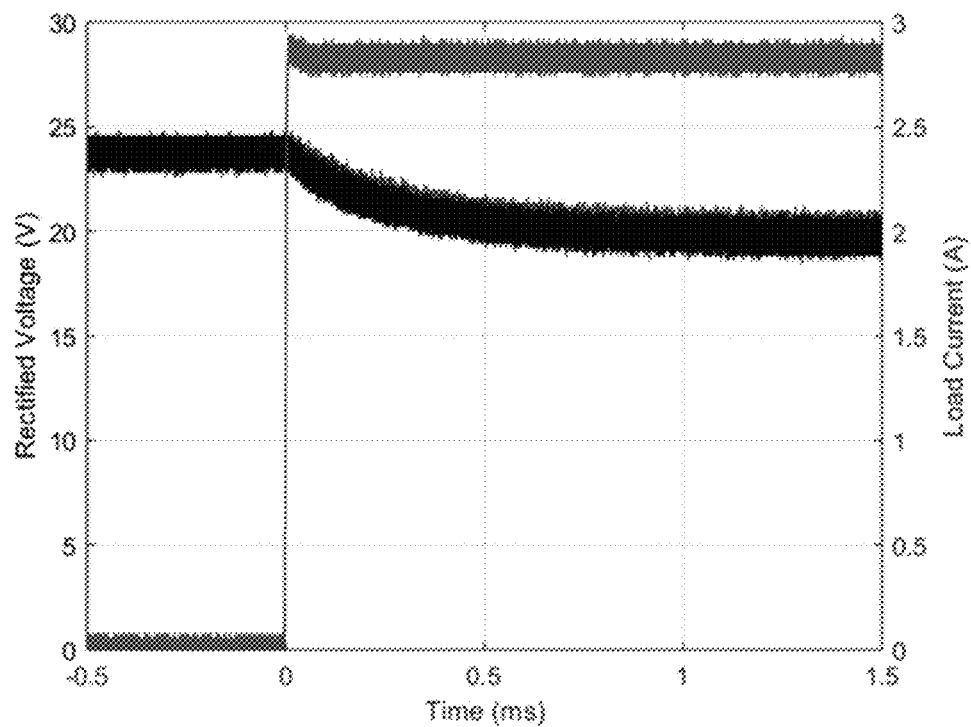
FIG. 18 is a graph of the response of a rectified voltage to a load step in the experimental design.

Turning now to FIG. 18, a graph of the response of the rectified voltage ($V_{rect}$) to a load step in the experimental wireless power transfer system is depicted. FIG. 18 shows the performance of the rectifier 100 under load step-changes. This may be particularly relevant in the context of evaluating the stability of timing recovery under dynamic conditions. To simulate load-step changes, the electronic load was configured to step from 0 to 2.8 A in approximately 10 µs (0.3 A/µs). The dynamic response to this load step is shown in FIG. 18.

The load current is initially at 0 A. At time 0 ms, the load current increases relatively instantaneously to approximately 2.8 A. This represents the load step. The load current is then constant from time 0 ms to time 1.5 ms at 2.8 A. Prior to the load current stepping or increasing to 2.8 A, the rectified voltage ($V_{rect}$) is approximately 23 V at time −0.5 ms. At time 0 ms when the load current increases or steps up, the rectified voltage ($V_{rect}$) begins a gradual decrease or decay to 20 over 1000 µs. The rectified voltage ($V_{rect}$) settles at 20 V where it remains at time 1.5 ms.

As shown in FIG. 18, although the load current rises very quickly, the rectified voltage ($V_{rect}$) decays from 23 V to 20 V gradually over approximately 1 ms. As shown in FIG. 18, the response of the rectified voltage is relatively smooth and controlled.

Figure 19:
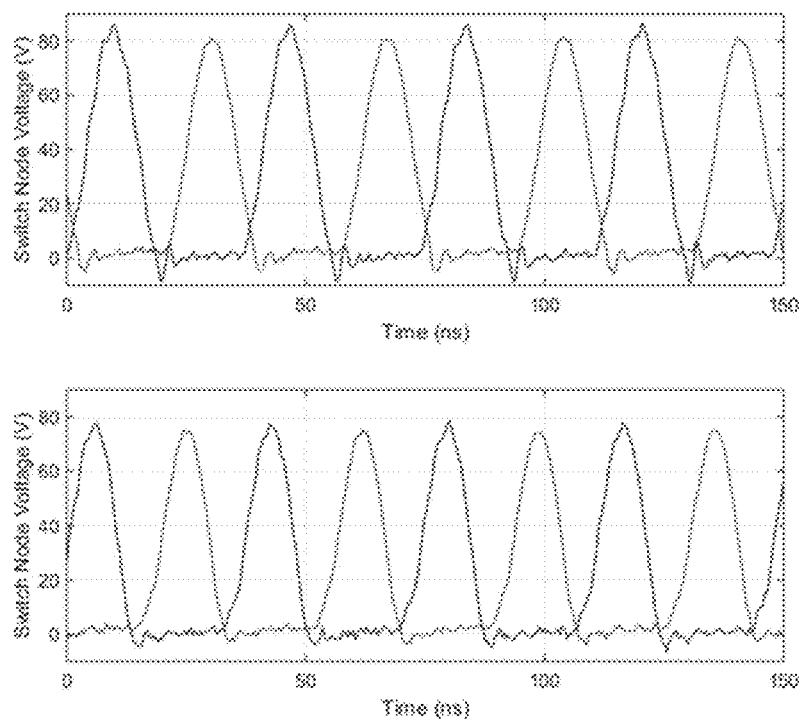
FIG. 19 are graphs of rectifier switch node voltages before and after loading of the experimental design.

Turning now to FIG. 19, graphs of rectifier switch node voltages before and after loading of the experimental wireless power transfer system are depicted. As shown in FIG. 19, the waveforms of the switch node voltages are generally unchanged safe for a small reduction in the peaks after loading. Thus, the rectifier 100 is shown to be stable, and load-independence is observed over a significant step change. Similar switch node voltage behaviour was present in the transmitter of the experimental wireless power transfer system.

In contrast, for passive rectification, the inverter switch nodes often change noticeably with load, an effect which is attributed to the non-negligible and non-linear junction capacitances of the diodes. This essentially translates to a significant phase-shift in the receiver input impedance with load. The fact that this does not occur with the rectifier 100 implies that the rectifier 100 presents a largely real impedance from no-load to full-load. As a result, inverter ZVS tuning can be better optimized in terms of efficiency.

As shown in these experimental results, the described rectifier is shown to be stable from no-load to full-load at operating frequencies of 13.56 MHz and 27.12 MHz.

Furthermore, at the operating frequency of 13.56 MHz the end-to-end efficiency was found to be 76% at an output power exceeding 70 W. This is achieved for rectifier voltages well below 60 V, providing significant flexibility in the design of the primary DC/DC converters 116.

At the operating frequency of 27.12 MHz the end-to-end efficiency was found to be 68% at an output power exceeding 35 W. The wireless power transfer system operating at 27.12 MHz may provide for a lower cost, and/or a faster and more straightforward manufacturing option.

Figure 20:
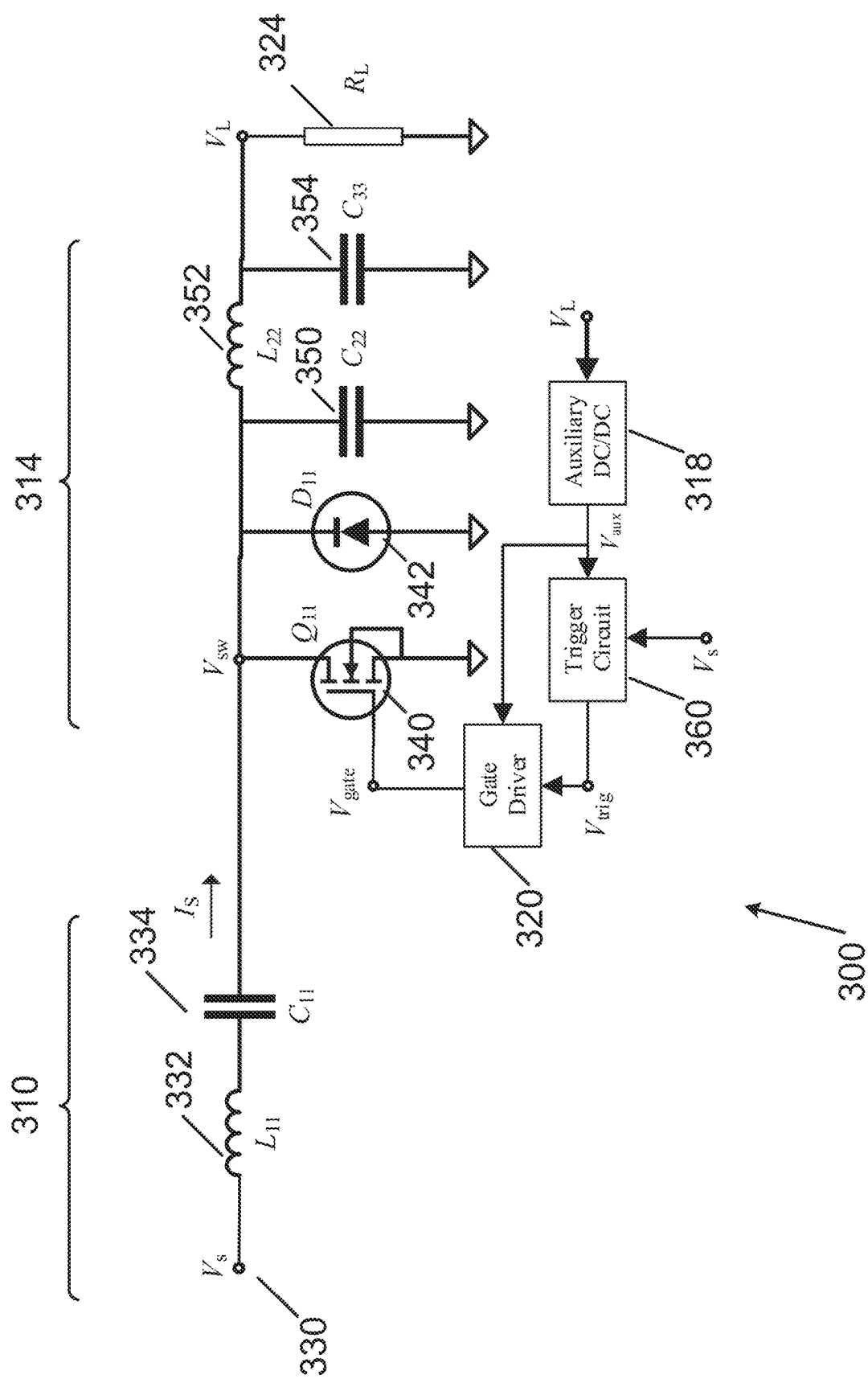
FIG. 20 is a schematic diagram of a receiver including a portion of another rectifier according to an aspect of the disclosure.

While a particular rectifier 100 has been described, one of skill in the art will appreciate that other configurations are possible. Turning now to FIG. 20, a receiver 300 comprising a rectifier is shown. In addition, similar to the receiver 102 shown in FIG. 4, the receiver 300 comprises a receive element 310, the rectifier element 314 and a load ($R_L$) 324.

The receive element 310 is configured to receive power from a transmitter, e.g. transmitter 10, using resonant or non-resonant electric or magnetic field coupling. The receive element 310 may extract power from a transmitter via non-resonant or resonant magnetic or electric field coupling. As such, the receive element 310 comprises one or more receive coils (i.e. inductors) or one or more capacitive electrodes. The corresponding transmitter comprises corresponding transmit coils (i.e. inductors) or capacitive electrodes, respectively. In FIG. 20, the receive element 310 is modelled as a voltage source ($V_s$) 330, an inductor 332 having an inductance $L_{11}$ and a capacitor 334 having a capacitance $C_{11}$. The voltage $V_s$, represents the signal received by the receive element 310. The load 324 may be variable or fixed.

The inductor 332 and capacitor 334 may form tuning elements which ensure resonance at the switching frequency of the receive element 310 and a corresponding transmit element of a transmitter of a wireless power transfer system. As one of skill in the art will appreciate, only of the inductor 332 and capacitor 334 may be present.

Similar to the rectifier 100 shown in FIG. 3, the rectifier 300 comprises a rectifier element 314, a gate driver 320, a trigger circuit 360 and an auxiliary DC/DC converter 318 connected to the gate driver 320. The rectifier element 314 comprises a switch ($Q_{11}$) which in the illustrated arrangement is a FET 340 and a diode ($D_{11}$) 342. The gate terminal of the FET 340 is electrically connected to the gate driver 320 such that a signal from the gate driver 320 controls operation of the FET 340. The drain terminal of the FET 340 is electrically connected to the receive element 310 such that the received power is rectified by the FET 340. The rectifier element 314 further comprises a capacitor 350 and a shunt capacitor 354. An inductor 352 is connected in series between capacitor 350 and shunt capacitor 354. The capacitance of the capacitor 350 is given by capacitance $C_{22}$, and the capacitance of the shunt capacitor 354 is given by capacitance $C_{33}$. The inductance of the inductor 352 is given by inductance $L_{22}$.

In contrast with the rectifier 100, the double impedance inverter circuit of the input stage 112 is not present in the rectifier 300. The double impedance inverter circuit is not required as feedback for the trigger circuit 360 is taken from $V_s$, i.e. the voltage received at the receive element 310.

Broadly speaking, the rectifier 300 is configured to provide a signal to the gate terminal of the FET 340 of the rectifier element 314 that is in phase with an input signal received by the receive element 310. In particular, trigger circuit 360 provides a signal that is in phase with the current received ($I_s$) by the rectifier element 314.

The voltage and current received by the receive element 310 may be given by equations (9) and (10) as:

$$V_S = \overline{V}_S \sin(\omega t) \tag{9}$$

$$i_s = \overline{i}_s \sin(\omega t - \varnothing) \tag{10}$$

where $V_s$ is the voltage received at the receive element 310, $\omega$ is the operating frequency, $I_s$ is the current induced at the receive element 310 and $\varnothing$ the phase difference between voltage and current induced at the receive element 310.

Figure 21:
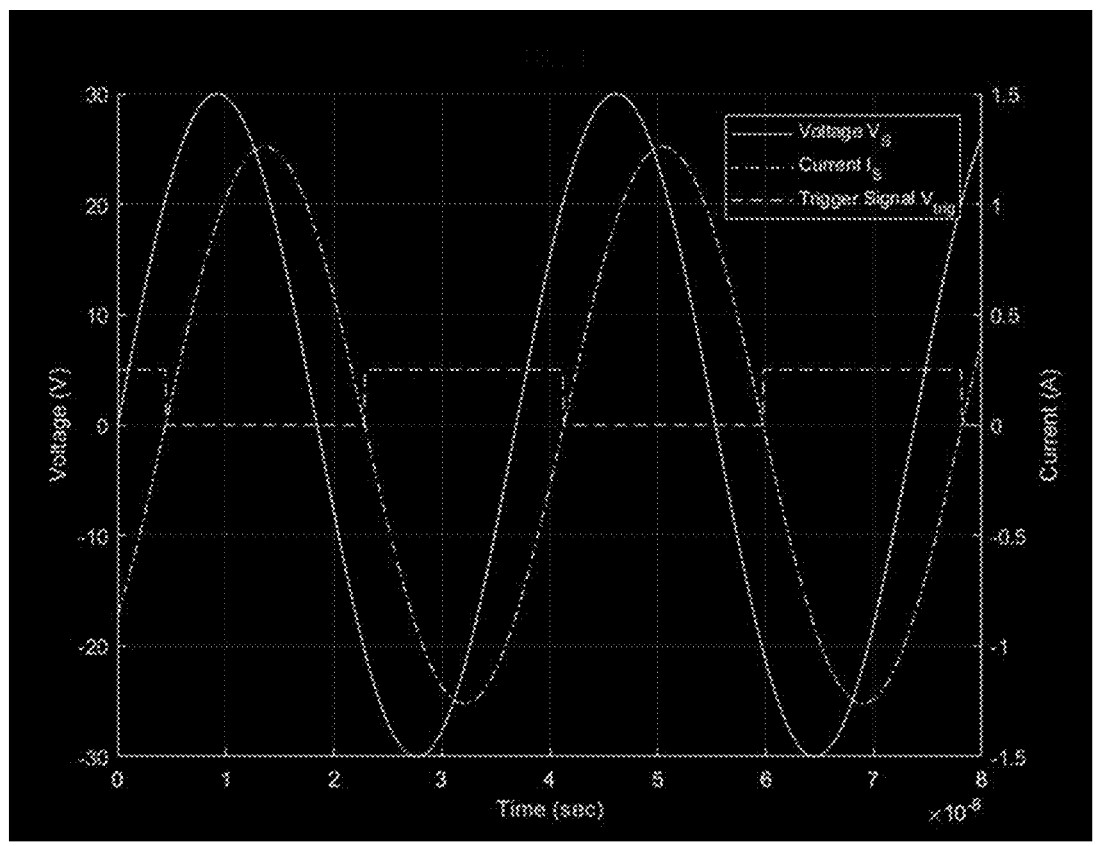
FIG. 21 is a graph of the received voltage and current, and a trigger signal generated by the rectifier.

FIG. 21 is a plot the received voltage $V_s$ and current $I_s$, and trigger signal $V_{trig}$. In particular, FIG. 21 is a plot of the voltage waveform $V_s$ received at the receive element 310, the current waveform $I_s$ at the receive element 310, and the trigger signal $V_{trig}$ output by the comparator circuit 366. FIG. 21 illustrates that ideal pulse which should be produced by the triggering circuit 360 and the gate driver 320. As shown in FIG. 21, the current $I_S$ is synchronized with the trigger signal $V_{trig}$.

The receive element 310 is electrically connected to the rectifier element 314. The rectifier element 314 is electrically connected to the load 324. In particular, the receive element 310 is electrically connected to the rectifier element 314 and the trigger circuit 360 as will be described. The rectifier element 314 is electrically connected to the receive element 310 and the gate driver 320. The gate driver 320 is electrically connected to the rectifier element 314, the trigger circuit 360 and the auxiliary DC/DC converter 318. The trigger circuit 360 is electrically connected to the receiving element 310, gate driver 320 and auxiliary DC/DC converter 318. The load 324 is electrically connected to the rectifier element 314.

Figure 22:
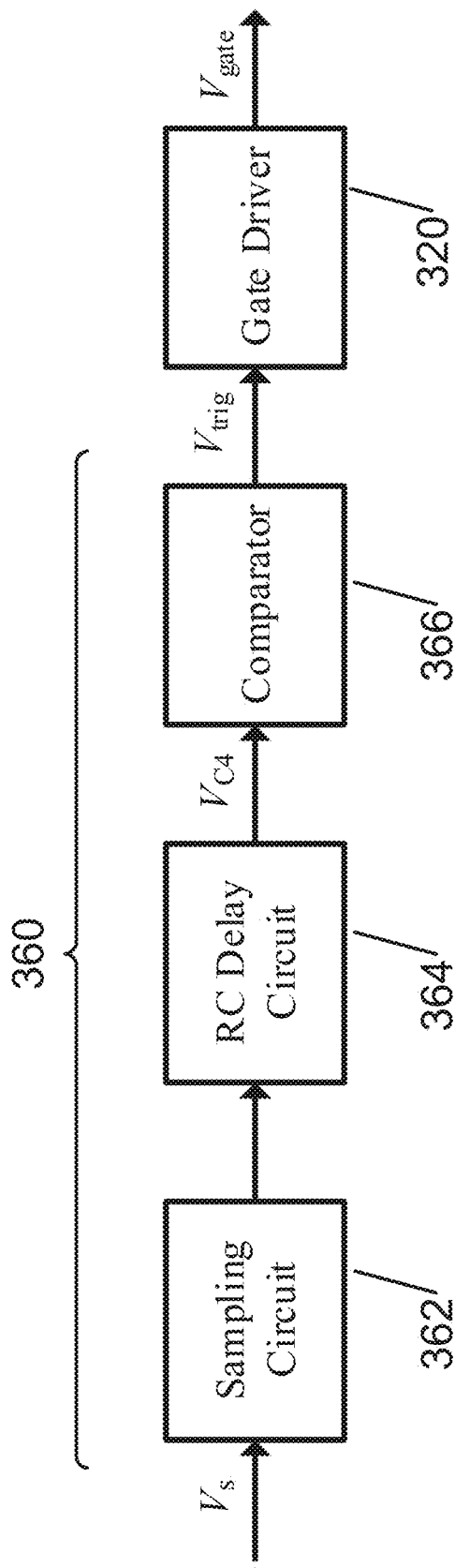
FIG. 22 is a block diagram of a portion of a rectifier according to an aspect of the disclosure.
Figure 23:
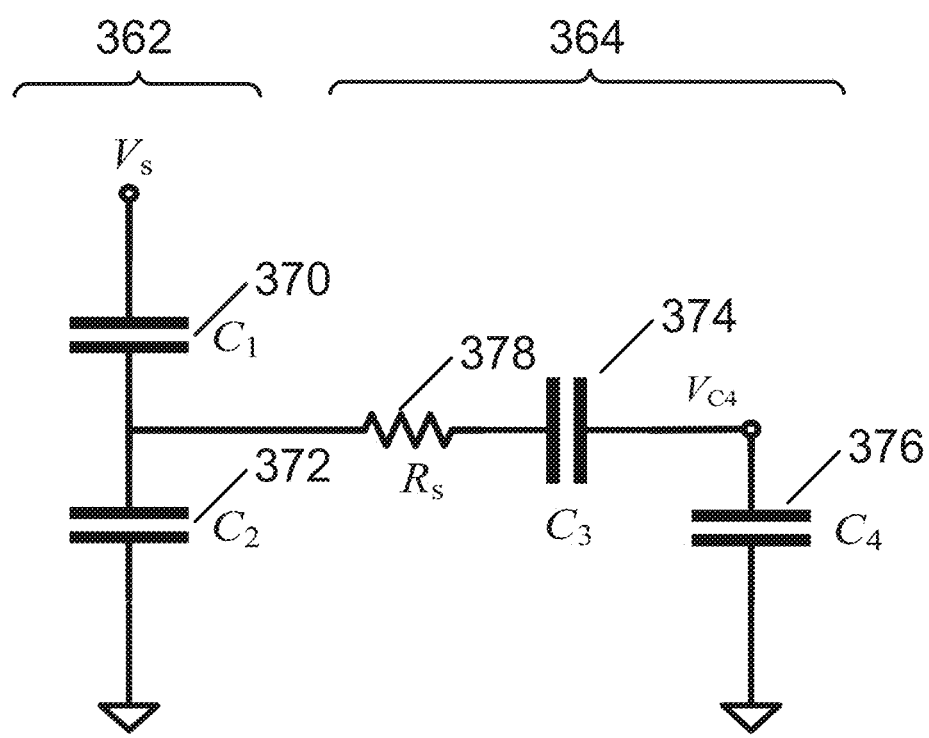
FIG. 23 is a schematic diagram of a portion of the rectifier.

Turning now to FIG. 22, a block diagram of the trigger circuit 360 and gate driver 320 is shown. As shown in FIG. 22, the input voltage or signal $V_s$ is sampled via a sampling circuit 362 and fed to a RC delay circuit 364. In the illustrated arrangement, the sampling circuit 362 is a voltage divider comprising of capacitors 370 and 372 with capacitances $C_1$ and $C_2$, respectively, as illustrated in FIG. 22. The RC delay circuit 364 comprises resistor 378 with a resistance $R_s$, capacitors 374 and 376 with capacitances $C_3$ and $C_4$, respectively, as shown in FIG. 23. The output of the RC delay circuit 364 ($V_{C4}$) is fed to a comparator circuit 366. The comparator circuit 366 is for generating a clock signal by comparing the delayed signal $V_{C4}$ generated by the RC delay circuit 364 to a DC level.

Turning now to FIG. 23, a schematic diagram of a portion of the trigger circuit 360, namely, the sampling circuit 362 and RC delay circuit 364 is shown in more detail. As previously stated, the sampling circuit 362 is for sampling a voltage waveform received by the receive element 310. As previously stated, the sampling circuit 362 is electrically connected to the receive element 310. As such, the sampling circuit 362 receives voltage waveform Vs from voltage source 330 of the receive element 310. The sampling circuit 362 comprises a first capacitive driving circuit comprising the capacitor 370 and the capacitor 372. The first capacitive driving circuit scales down the voltage $V_s$. By selecting capacitance values $C_1$ and $C_2$ of capacitors 370 and 372, respectively, with low enough values, the loading effect of the sampling circuit 362 can be minimized and neglected.

The RC delay circuit 364 further comprises a series resistor 378 and a second capacitive driving circuit comprising capacitor 374 and capacitor 376. The second capacitive driving circuit further scales down the already scaled voltage $V_s$.

By selecting appropriate values of $R_s$, the phase difference of Ø in Equation (10) may be compensated.

Figure 24:
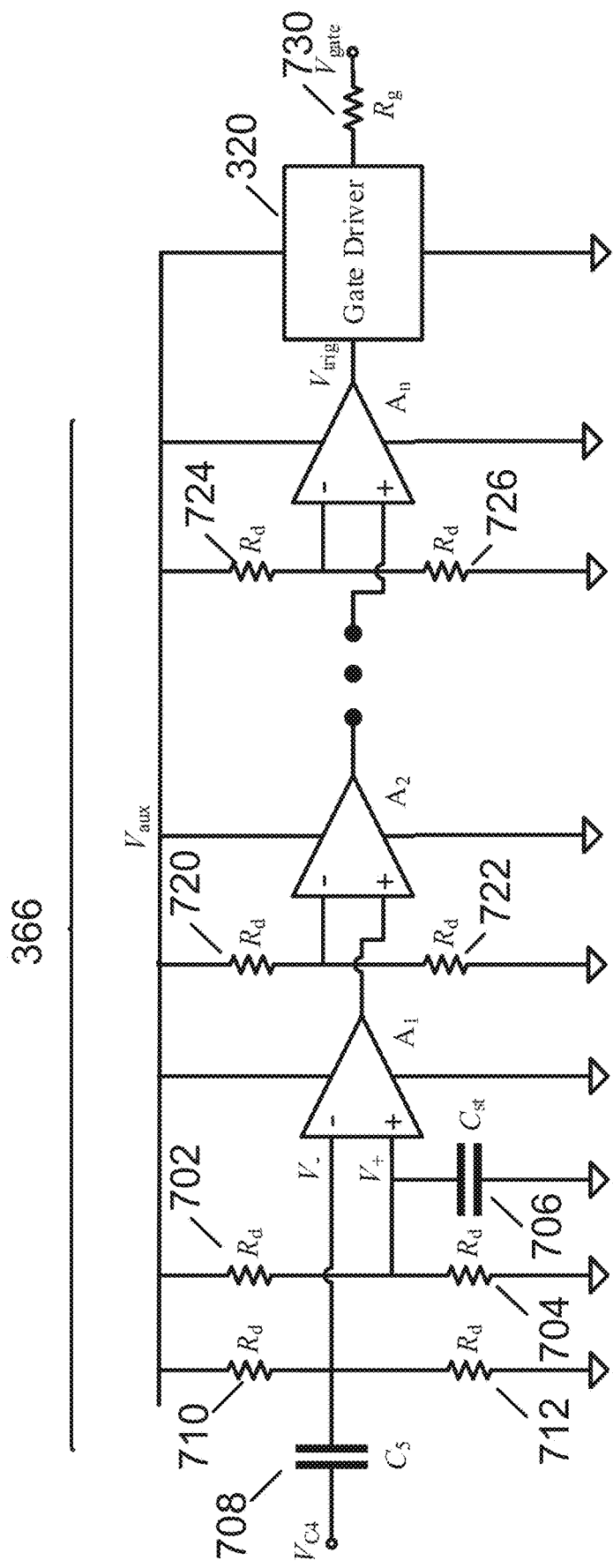
FIG. 24 is a schematic diagram of a portion of the rectifier.

Turning now to FIG. 24, a schematic of another portion of the rectifier is shown in more detail. The schematic diagram illustrates an exemplary arrangement of the comparator circuit 366 and the gate driver 320. As shown in FIG. 24, the comparator circuit 366 comprises one or more comparators ($A_1, A_2, \ldots A_n$) and is powered from the auxiliary supply, $V_{aux}$. The inputs of the comparators ($A_1, A_2, \ldots A_n$) are biased to roughly half of $V_{aux}$. For the positive input of the first comparator $A_1$ input, V+, this is achieved using two equal-valued resistors 702 and 704, each with a resistance of $R_d$. Capacitor 706 with a capacitance of $C_{st}$ is added to hold up the voltage at the positive input.

The negative input of the first comparator $A_1$ is a summation of the voltage across capacitor 708 which has a capacitance of $C_4$, i.e. voltage $V_{c4}$ and a DC bias voltage equal to half of $V_{aux}$. This is achieved using two equal-valued resistors 710 and 712, each with a resistance of $R_d$. The summation may be achieved by using capacitor 708. The positive input of the first comparator $A_1$ is a DC bias voltage equal to DC bias voltage at the negative input. Since the DC bias voltage at both positive and negative input must be equal, the voltage dividing circuit on each pin can be identical to each other. The auxiliary voltage $V_{aux}$ that is used to feed the first comparator $A_1$ may also be used to generate the DC bias voltage at negative and positive input of the first comparator $A_1$. Multiple comparators ($A_2, \ldots A_n$) can be added to add more delay due to the intrinsic propagation delay of the first comparator $A_1$. The positive input on any additional comparator $A_i$ will be connected to the output of the preceding comparator $A_{i-1}$ (the positive input of $A_2$ is connected to the output of $A_1$ and etc.). The negative input of any additional comparator ($A_2, \ldots, A_n$) is biased to roughly half of $V_{aux}$. This is achieved using two equal-valued resistors (e.g. resistors 720, 722/724, 726 each with a resistance of $R_d$. The output of the last comparator $A_n$ provides a trigger signal $V_{trig}$ to the gate driver 320 which includes a resistor 730 with a resistance $R_g$.

Figure 25:
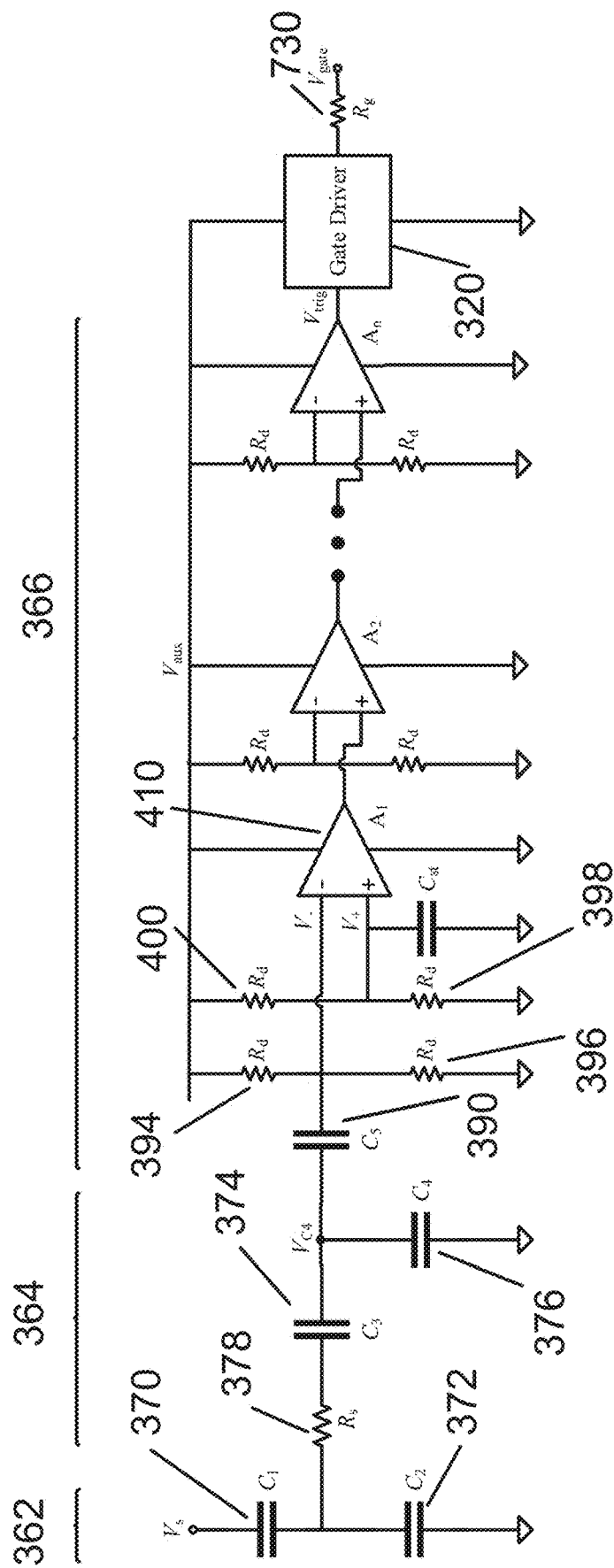
FIG. 25 is a schematic diagram of a portion of the rectifier.

Turning now to FIG. 25, a schematic of the sampling circuit 362, the RC delay circuit 364 and the comparator 366 is shown in more detail. The schematic illustrates an exemplary arrangement of the sampling circuit 362, the RC delay circuit 364, the comparator circuit 366 and the gate driver 320. As previously stated, the comparator circuit 366 is for generating a clock signal by comparing the generated signal by the RC delay circuit 364 to a DC level. As previously sated, the gate driver 320 is for adapting the trigger signal output by the trigger circuit 360 to generate a gate signal to operate the FET 340 of the rectifier element 314. The gate driver 320 is configured to generate a gate signal based on the voltage across capacitor 376, e.g. voltage $V_{C4}$. The gate driver 320 is power from an auxiliary power supply $V_{aux}$.

As previously stated, the RC delay circuit 364 comprises a series resistor 378 and a second capacitive driving circuit comprising capacitor 374 and capacitor 376. The second capacitive driving circuit further scales down the already scaled voltage $V_s$. The scaled voltage can be expressed according to equation (11):

$$V_{C4} = V_S \frac{X_2 X_4}{[(X_1 + X_2)(X_3 + X_4) + X_1 X_2] + j[R_S(X_1 + X_2)]} \quad (11)$$

where each $X_i$ is the reactance of the respective capacitor $C_i$ and where $V_{C4}$ is the voltage at the capacitor 376.

Each element $X_i$ may be expressed in equation (12) as:

$$X_i = \frac{1}{\omega C_i} \quad (i = 1 \text{ to } 4) \quad (12)$$

Therefore, the phase of the capacitor 376 may be expressed in equation (13) as:

$$\phi_{V_{C4}} = -\tan^{-1} \frac{[R_S(X_1 + X_2)]}{[(X_1 + X_2)(X_3 + X_4) + X_1 X_2]} \quad (13)$$

where $R_s$ is the resistance of the resistor 378.

By selecting appropriate values of $R_s$, the phase difference of Ø in Equation (10) may be compensated.

Figure 26:
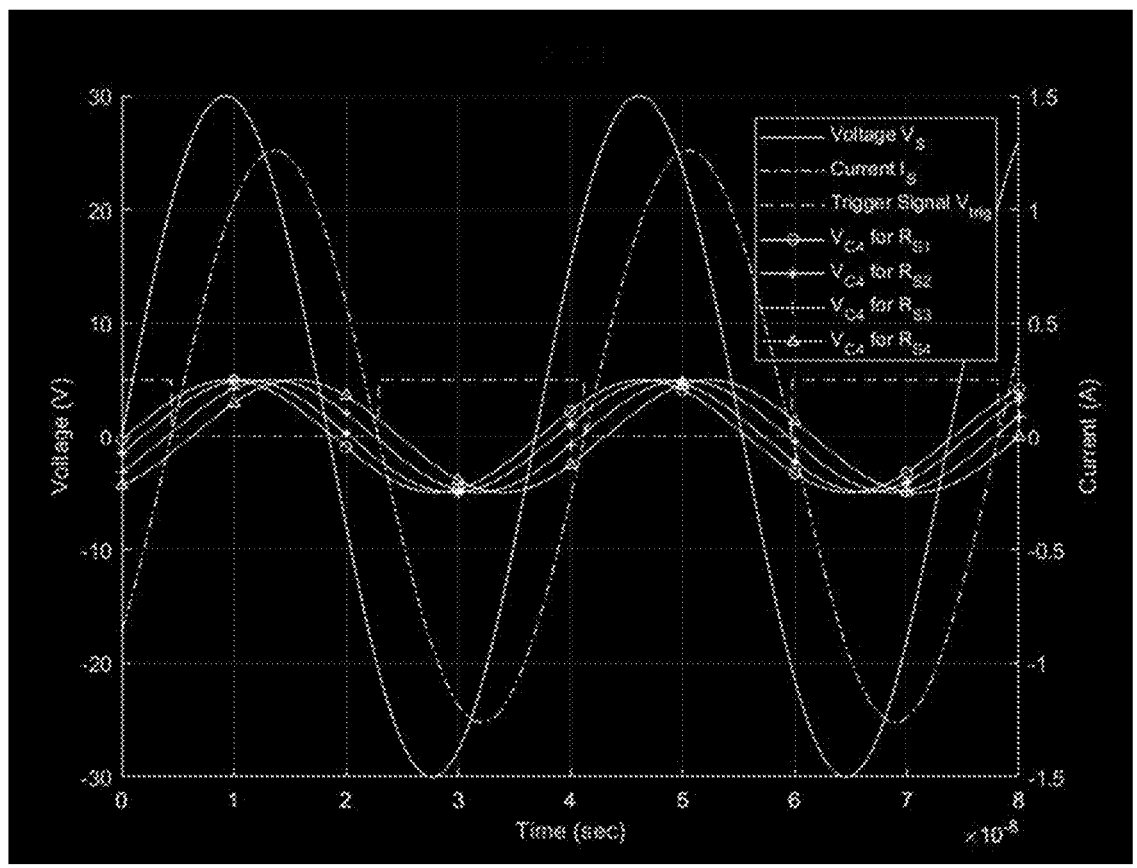
FIG. 26 is a graph of the received voltage and current, trigger signal and delayed signal for different values of resistances at the rectifier.

FIG. 26 is a plot of the received voltage $V_s$ and current $I_s$, trigger signal $V_{trig}$ and voltages $V_{C4}$ for different values of resistor 378. In particular, the resistance $R_s$ of resistor 378 equals $R_{s1}$, $R_{s2}$, $R_{s3}$ and $R_{s4}$, where $R_{s1} > R_{s2} > R_{s3} > R_{s4}$. FIG. 26 shows the effects of $R_s$ of the phase of the voltage $V_{C4}$. It can be seen that, for certain value of resistance $R_s$ (here $R_{s3}$), the phase of the voltage $V_{C4}$ is identical with current of $I_s$ and this signal can be used to trigger the gate of the FET 340.

While particular trigger circuits 122 and 360 and gate driver 120 and 320, have been described, one of skill in the art will appreciate that other configurations are possible.

While particular rectifier elements have been described, one of skill in the art will appreciate that other configurations are possible. In another embodiment, the current between the drain and source of the switch is controlled by the current to the gate of the switch rather than the voltage at the gate.

Each individual feature described herein is disclosed in isolation and any combination of two or more features is disclosed to the extent that such features or combinations are capable of being carried out based on the specification as a whole in the light of the common general knowledge of one of skill in the art, irrespective of whether such features or combination of features solve any problems disclosed herein, and without limitation to the scope of the claims. Aspects of the disclosure may consist of any such individual feature or combination of features. In view of the foregoing description it will be evident to one of skill in the art that various modifications may be made within the scope of the disclosure.

What is claimed is:

1. A rectifier for use in a receiver of a wireless power transfer system, the rectifier for receiving wireless power transferred from a transmitter of the wireless power transfer system, the rectifier comprising a field effect transistor (FET) comprising:

a source terminal electrically connected to ground;

a drain terminal electrically connected to a receive element of the receiver, the receive element for extracting power from the transmitter of the wireless power transfer system; and a gate terminal electrically connected to the receive element, the gate terminal driven by a gate signal in phase with an input signal received at the receive element; and a trigger circuit electrically connected to the receive element and a gate driver, the trigger circuit outputting a trigger signal for operating the gate driver, wherein the trigger circuit comprises:

a sampling circuit for sampling the input signal; and a delay line for delaying output of the sampling circuit such that the gate signal is synchronized with the input signal received at the drain terminal.

2. The rectifier of claim 1, wherein the trigger signal comprises a pulse signal.

3. The rectifier of claim 1, wherein the sampling circuit is a voltage divider.

4. The rectifier of claim 1, wherein the trigger circuit comprises:

a resistor-capacitor (RC) delay circuit for delaying output of the sampling circuit such that the gate signal is synchronized with the input signal received at the receive element.

5. The rectifier of claim 4, wherein the RC delay circuit comprises at least one resistor electrically connected to at least one capacitor.

6. The rectifier of claim 4, wherein the trigger circuit comprises:

a comparator for generating a clock signal by comparing a delayed signal output by the RC delay circuit to a DC voltage level.

7. The rectifier of claim 1, further comprising at least one:

the gate driver for receiving the trigger signal and producing the gate signal for input into the gate terminal to control operation of the rectifier; and an input stage for at least one of: optimizing load impedance, ensuring current input to the drain terminal is approximately sinusoidal, and reducing harmonics.

8. The rectifier of claim 1, further comprising:

a converter for converting a signal for powering the trigger circuit.

9. The rectifier of claim 1, wherein the rectifier is a load-independent class E synchronous rectifier.

10. The receiver for extracting power from a transmitter of the wireless power transfer system, the receiver comprising:

the receive element for receiving wireless power transferred from the transmitter; and the rectifier of claim 1, the rectifier electrically connected to the receive element.

11. The receiver of claim 10, wherein the receive element is for extracting power via resonant and/or non-resonant electric or magnetic field coupling.

12. The wireless power transfer system for transmitting power via magnetic or electric field coupling, the wireless power transfer system comprising:

the transmitter comprising a transmit element for generating a magnetic or electric field;

the receiver comprising:

the receive element for extracting power from the magnetic or electric field via magnetic or electric field coupling, respectively; and the rectifier of claim 1, the rectifier electrically connected to the receive element.

13. A method of rectifying an input signal received at a receive element of a receiver of a wireless power transfer system, the receiver comprising a rectifier comprising a field effect transistor (FET) comprising:

a source terminal electrically connected to ground;

a drain terminal electrically connected to the receive element; and a gate terminal electrically connected to the receive element, the method comprising:

driving the gate terminal by a gate signal in phase with the input signal received at the receive element;

driving a gate driver for generating the gate signal;

receiving the input signal at a trigger circuit;

operating the gate driver via a trigger signal output by the trigger circuit;

sampling the input signal via a sampling circuit; and delaying output of the sampling circuit such that the gate signal is synchronized with the input signal received at the receive element.

* * * * *